US011087167B2

(12) United States Patent
Das et al.

(10) Patent No.: US 11,087,167 B2
(45) Date of Patent: Aug. 10, 2021

(54) FIRST-PERSON CAMERA BASED VISUAL CONTEXT AWARE SYSTEM

(71) Applicant: Robert Bosch GmbH, Stuttgart (DE)

(72) Inventors: Samarjit Das, Sewickley, PA (US); Gonzalo Vaca, Orlando, FL (US); Joao P. Sousa, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 1029 days.

(21) Appl. No.: 15/538,174

(22) PCT Filed: Dec. 22, 2015

(86) PCT No.: PCT/US2015/067507
§ 371 (c)(1),
(2) Date: Sep. 28, 2017

(87) PCT Pub. No.: WO2016/106383
PCT Pub. Date: Jun. 30, 2016

(65) Prior Publication Data
US 2017/0364766 A1    Dec. 21, 2017

Related U.S. Application Data

(60) Provisional application No. 62/095,268, filed on Dec. 22, 2014.

(51) Int. Cl.
*G06N 20/00* (2019.01)
*G06K 9/46* (2006.01)
(Continued)

(52) U.S. Cl.
CPC ....... *G06K 9/4628* (2013.01); *G06K 9/00664* (2013.01); *G06K 9/00671* (2013.01);
(Continued)

(58) Field of Classification Search
CPC ............. G06K 9/4628; G06K 9/00664; G06K 9/00671; G06K 9/00684; G06K 9/00718; G06K 9/00771; G06N 20/00
See application file for complete search history.

(56) References Cited

U.S. PATENT DOCUMENTS

2005/0220341 A1    10/2005   Akahori
2007/0253699 A1    11/2007   Yen et al.
(Continued)

OTHER PUBLICATIONS

Kevin Lai, Liefeng Bo, Xiaofeng Ren, and Dieter Fox, "Detection-based Object Labeling in 3D Scenes", May 2012, 2012 IEEE International Conference on Robotics and Automation, pp. 1330-1337. (Year: 2012).*
(Continued)

*Primary Examiner* — Kamran Afshar
*Assistant Examiner* — Ying Yu Chen
(74) *Attorney, Agent, or Firm* — Maginot, Moore & Beck LLP

(57) ABSTRACT

A method is disclosed of discriminating detected objects in an area with a vision apparatus. The method includes generating image data of a portion of the area using an imaging device of the object detection device, and processing the image data to classify the image data as an imaged scene type selected from a plurality of scene types stored as scene type data in the memory. The method further includes processing the image data using the object identification data to generate object detection data for each object of the plurality of objects located in the portion of the area, each object detection data having a corresponding scene type of the plurality of scene types obtained from the object identification data, and generating user a sensible output only for the object detection data having a corresponding scene type that is the same as the imaged scene type.

18 Claims, 26 Drawing Sheets

(51) Int. Cl.
G06K 9/00 (2006.01)
G06F 3/01 (2006.01)
G09B 21/00 (2006.01)

(52) U.S. Cl.
CPC ..... *G06K 9/00684* (2013.01); *G06K 9/00718* (2013.01); *G06K 9/00771* (2013.01); *G06N 20/00* (2019.01); *G06F 3/011* (2013.01); *G09B 21/006* (2013.01)

(56) References Cited

U.S. PATENT DOCUMENTS

| | | |
|---|---|---|
| 2008/0294400 A1 | 11/2008 | Czora |
| 2011/0044502 A1 | 2/2011 | Liu et al. |
| 2013/0011016 A1 | 1/2013 | Haas et al. |
| 2014/0355879 A1* | 12/2014 | Agosta .................. G06T 7/143 382/170 |

OTHER PUBLICATIONS

Jian Yao, Sanja Fidler, and Raquel Urtasun, "Describing the Scene as a Whole: Joint Object Detection, Scene Classification and Semantic Segmentation", 2012, IEEE, pp. 702-709. (Year: 2012).*

Subhashini Venugopalan, Huijuan Xu, Jeff Donahue, Marcus Rohrbach, Raymond Mooney, and Kate Saenko, "Translating Videos to Natural Language Using Deep Recurrent Neural Networks", arXiv, Dec. 15, 2014, pp. 1-10. (Year: 2014).*

Xiangrong Chen and Alan L. Yuille, "A Time-Efficient Cascade for Real-Time Object Detection: With applications for the visually impaired", 2005, Proceedings of the 2005 IEEE Computer Society Conference on Computer Vision and Pattern Recognition (CVPR'05), pp. 1-8. (Year: 2005).*

Jincheng Huang, Zhu Liu, and Yao Wang, "Joint Scene Classification and Segmentation Based on Hidden Markov Model", Jun. 2005, IEEE Transactions on Multimedia, vol. 7, No. 3, pp. 538-550. (Year: 2005).*

A. Torralba, K.P. Murphy, and W.T. Freeman, "Using the Forest to See the Trees: Exploiting Context for Visual Object Detection and Localization", 2010, Communications of the ACM, vol. 53 No. 3, pp. 107-114. (Year: 2010).*

International Search Report corresponding to PCT Application No. PCT/US2015/067507, dated Jun. 29 2016 (3 pages).

Vaca-Castano et al.; Improved Scene Identification and Object Detection on Egocentric Vision of Daily Activities; Dec. 15, 2015 (36 pages).

Supplementary European Search Report corresponding to European Patent Application No. 15 87 4348 (16 pages).

Torralba, A. et al., "Context-based vision system for place and object recognition," in Proceedings of 9th IEEE International Conference on Computer Vision, 2003 (8 pages).

Rekimoto, J. et al., "The World through the Computer: Computer Augmented Interaction with Real World Environments," in Proceedings of 8th Annual Symposium on User Interface Software and Technology, 1995 (8 pages).

Rosten, E. et al., "Real-Time Video Annotations for Augmented Reality," ISVC 2005, LNCS 3804, pp. 294-302, 2005 (9 pages).

Supplementary Partial European Search Report from corresponding EP application 15 87 4348 dated Aug. 1, 2018 (13 pages).

Mottaghi Roozbeh et al., "The Role of Context for Object Detection and Semantic Segmentation in the Wild," 2014 IEEE Conference on Computer Vision and Patten Recognition, Jun. 23, 2014 (8 pages).

Felzenszwalb et al., "Object Detection with Discriminatively Trained Part-Based Models," IEEE Transactions on Pattern Analysis and Machine Intelligence, IEEE Computer Society, USA, Sep. 1, 2010 (20 pages).

* cited by examiner

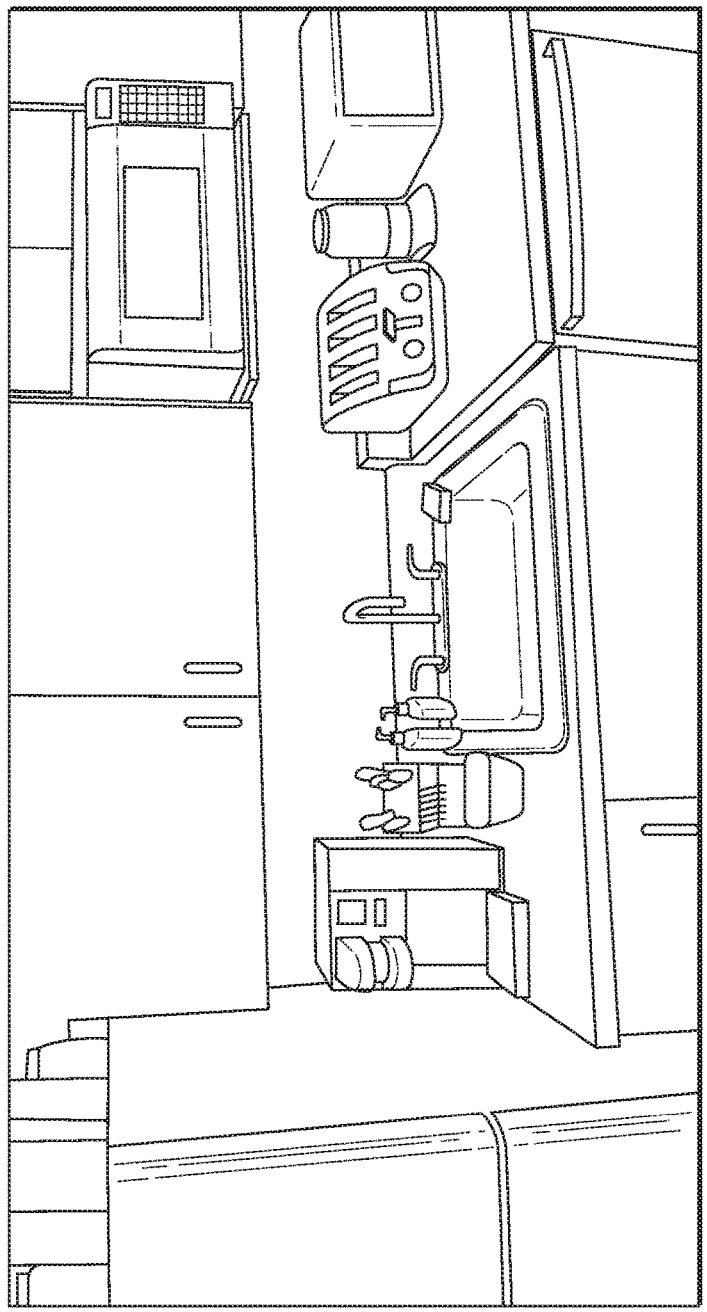 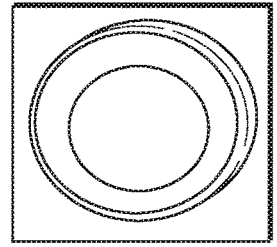  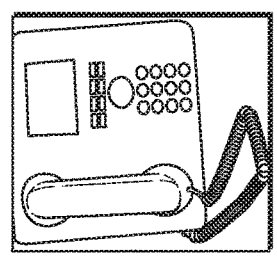  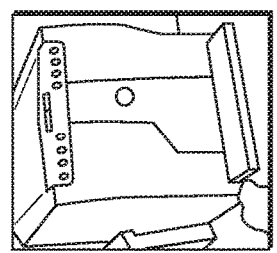 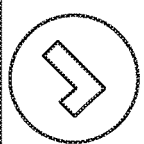 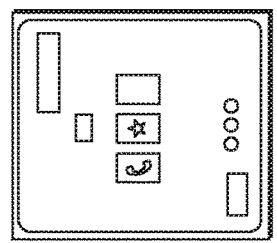 
FIG. 21

FIRST-PERSON CAMERA BASED VISUAL CONTEXT AWARE SYSTEM

This application is a 35 U.S.C. § 371 National Stage Application of PCT/US2015/067507, filed on Dec. 22, 2015, which claims the benefit of priority of U.S. provisional application Ser. No. 62/095,268, filed on Dec. 22, 2014, the disclosures of which are herein incorporated by reference in their entirety.

This disclosure relates generally to object detection and particularly to context-based object detection.

BACKGROUND

First-person vision or egocentric vision refers to the automatic analysis of image data captured from a first-person view perspective. Typically, a first-person vision system includes a vision sensor, such as a digital camera, that is wearable by the user. First-person vision systems are typically capable of automatically detecting objects in view of the user. After detecting an object, the first-person vision system generally provides assistance, advice, suggestions, or guidance to the user based on the type of object detected. For example, a first-person vision system suitable for use by a visually impaired person may be configured to detect household objects and to describe audibly the location of the detected household objects to the user.

First-person vision has recently received significant interests from the computer vision community since the advent of affordable and powerful wearable vision sensors. However, currently available first-person vision systems lack the ability to provide assistance to a user based on the context in which the user is located. For example, in an Activities of Daily Living (ADL) context, users typically perform specific activities in specific rooms or areas of a dwelling. These rooms provide valuable context to human observers. For example, human observers understand that it is very unlikely to find a refrigerator in a bathroom; thus, a large rectangular object located in the bathroom is immediately understood to be a shower stall and not a refrigerator. Known first-person vision systems, however, do not benefit from this context and, thus, may incorrectly interpret image data of a bathroom as including a refrigerator. Accordingly, further developments in the area of first-person vision systems are desirable.

SUMMARY

According to an exemplary embodiment of the disclosure, a method is disclosed of discriminating detected objects in an area including a plurality of objects with a vision apparatus including an imaging device, a processor, and a memory storing scene type data and object identification data. The method includes generating image data of a portion of the area using the imaging device of the object detection device, and processing the image data to classify the image data as an imaged scene type selected from a plurality of scene types stored as the scene type data in the memory of the object detection system. The method further includes processing the image data using the object identification data to generate object detection data for each object of the plurality of objects located in the portion of the area, each object detection data having a corresponding scene type of the plurality of scene types obtained from the object identification data, and generating user a sensible output only for the object detection data having a corresponding scene type that is the same as the imaged scene type.

According to another exemplary embodiment of the disclosure, a vision apparatus is configured to discriminate detected objects in an area including a plurality of objects. The vision apparatus includes an imaging device, a memory, and a processor. The memory stores scene type data, object identification data, and program instructions. The processor is operably connected to the imaging device and the memory. The processor is configured to execute the program instructions to generate image data of a portion of the area using the imaging device of the object detection device, to process the image data to classify the image data as an imaged scene type selected from a plurality of scene types stored as the scene type data in the memory of the object detection system, to process the image data to generate object detection data for each object of the plurality of objects located in the portion of the area, each object detection data having a corresponding scene type of the plurality of scene types, and to ignore the object detection data having a corresponding scene type that is different from the imaged scene type of the image data.

BRIEF DESCRIPTION OF THE DRAWINGS

The above-described features and advantages, as well as others, should become more readily apparent to those of ordinary skill in the art by reference to the following detailed description and the accompanying figures in which:

FIG. 21 shows a frame of image data and four possible object detection data with only one of the object detection data (coffee maker, second from the left) having the same scene type as the frame of image data;

DETAILED DESCRIPTION

Figure 1:
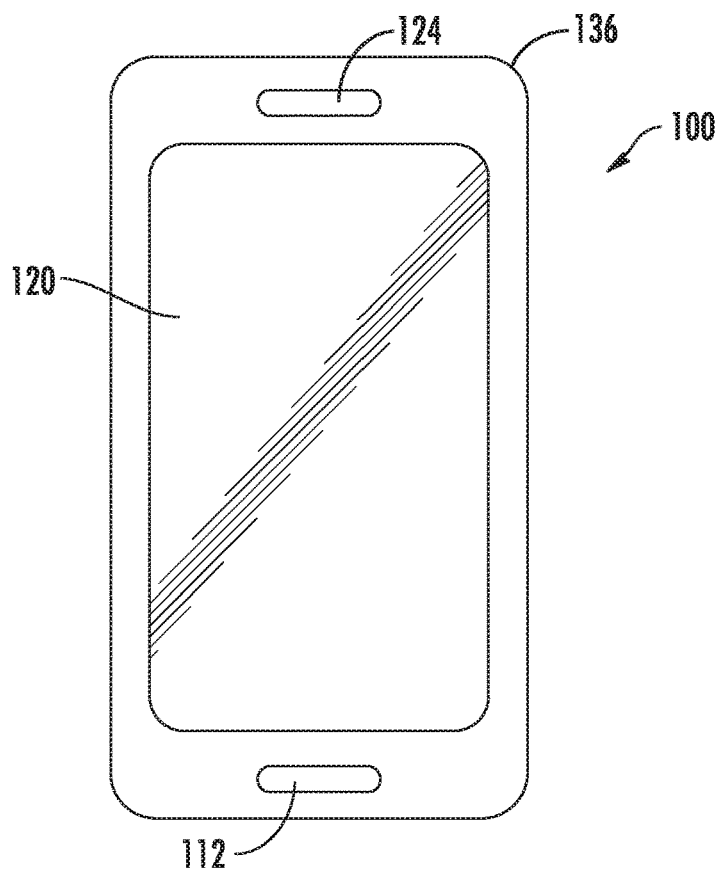
FIG. 1 is a block diagram of an exemplary first-person vision apparatus configured to discriminate detected objects based on scene data, as disclosed herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Figure 2:
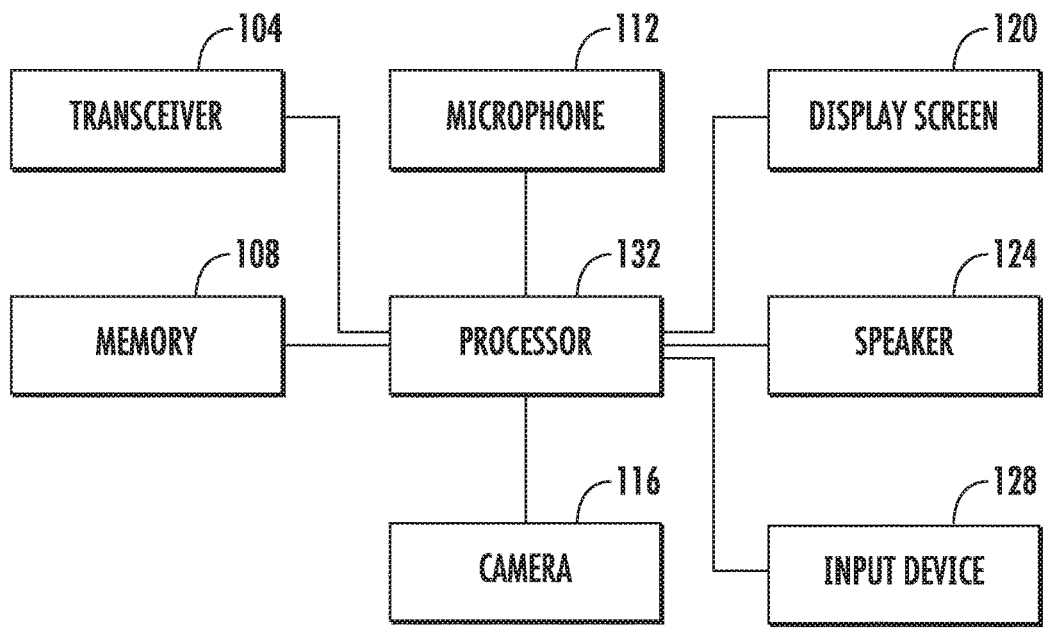
FIG. 2 is a block diagram of the vision apparatus of FIG. 1, showing certain components of the vision apparatus including a transceiver, a microphone, a display screen, a memory, a processor, a speaker, a camera, and an input device.

With reference to FIGS. 1 and 2, a first-person vision apparatus 100, which is illustrated in this exemplary embodiment as a smart phone, is configured to detect objects in an area including a plurality of objects. The vision apparatus 100, which is also referred to herein as an egocentric vision system, includes, a transceiver 104, a memory 108, a microphone 112, a camera 116, a display screen 120, a speaker 124, and an input device 128 each of which is connected to a processor 132 and supported by a housing 136 (FIG. 1).

The transceiver 104 is electrically connected to the processor 132 and is configured as a wireless input/output device that connects the vision apparatus 100 to a corresponding transceiver of another apparatus (not shown), such a cellular communication module or a wireless router connected to the internet. When the transceiver 104 is connected to another apparatus, electronic data are transmittable between the vision apparatus 100 and the connected apparatus. Accordingly, in at least one embodiment, the vision apparatus 100 is configured to receive data from the internet and to be used a cellular phone.

The microphone 112 is configured to generate input data representative of sounds near the vision apparatus 100. In one embodiment, the microphone 112 enables a user to control operation of the vision apparatus 100, simply by speaking, such that the microphone 112 is configured as an I/O device that is configured to receive a user selection. For example, the processor 132 may be configured to detect a selected sound from the data generated by the microphone 112.

The camera 116 is a color camera that generates image data representative of a field of view of the camera 116. In particular, the camera 116, which also referred to herein as an imaging device, generates image data of a portion of the area in front vision apparatus 100 including the objects located in the area. The camera 116 is any camera as desired by those ordinary skill in the art.

The display screen 120, in one embodiment, is a liquid crystal display (LCD) panel configured to render and to display text, images, and other user sensible outputs and visually comprehensible data. For example, the display screen 120 is configured to render data, such as detected object data and a graphical user interface for controlling the vision apparatus 100. The display screen 120, in another embodiment, is any display as desired by those of ordinary skill in the art, including, but not limited to, an active-matrix organic light-emitting diode display.

With continued reference to FIGS. 1 and 2, the speaker 124 is configured to generate user sensible outputs in the form of sound in response to receiving an audio signal from the processor 132. Typically, the speaker 124 generates sounds that assist a user of the vision apparatus 100 in operating the vision apparatus or performing a task. For example, the speaker 124 produces sound from a text to speech function of the processor 132, which converts instruction data to a user sensible output. The speaker 124 is any speaker as desired by those ordinary skill in the art.

The input device 128 is a touchscreen applied over the display 120 that is configured to respond to the touch of a finger or a stylus by generating user input data. Accordingly, the input device 128, also referred to herein as an input unit, is configured to enable a user to enter text data and to manipulate objects shown on the display 120. In another embodiment, the input device 128 includes a plurality of buttons that are configured to generate input data when touched by a user. In yet another embodiment, the input device 128 is any device configured to generate an input signal and/or input data, as desired by those of ordinary skill in the art.

Figure 3:
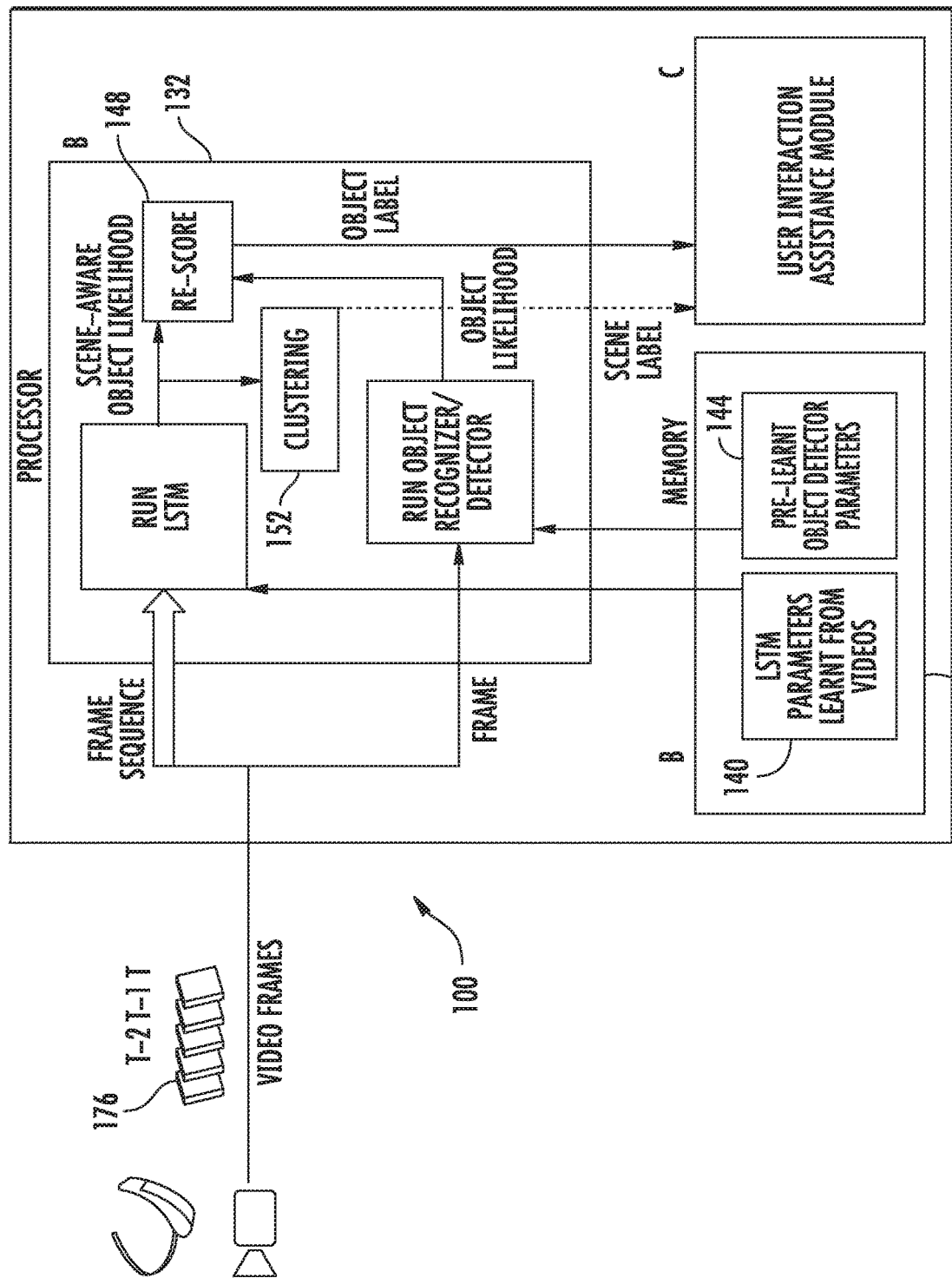
FIG. 3 is a block diagram of a first embodiment of the processor and the memory of FIG. 2, the processor including an LSTM network.
Figure 5:
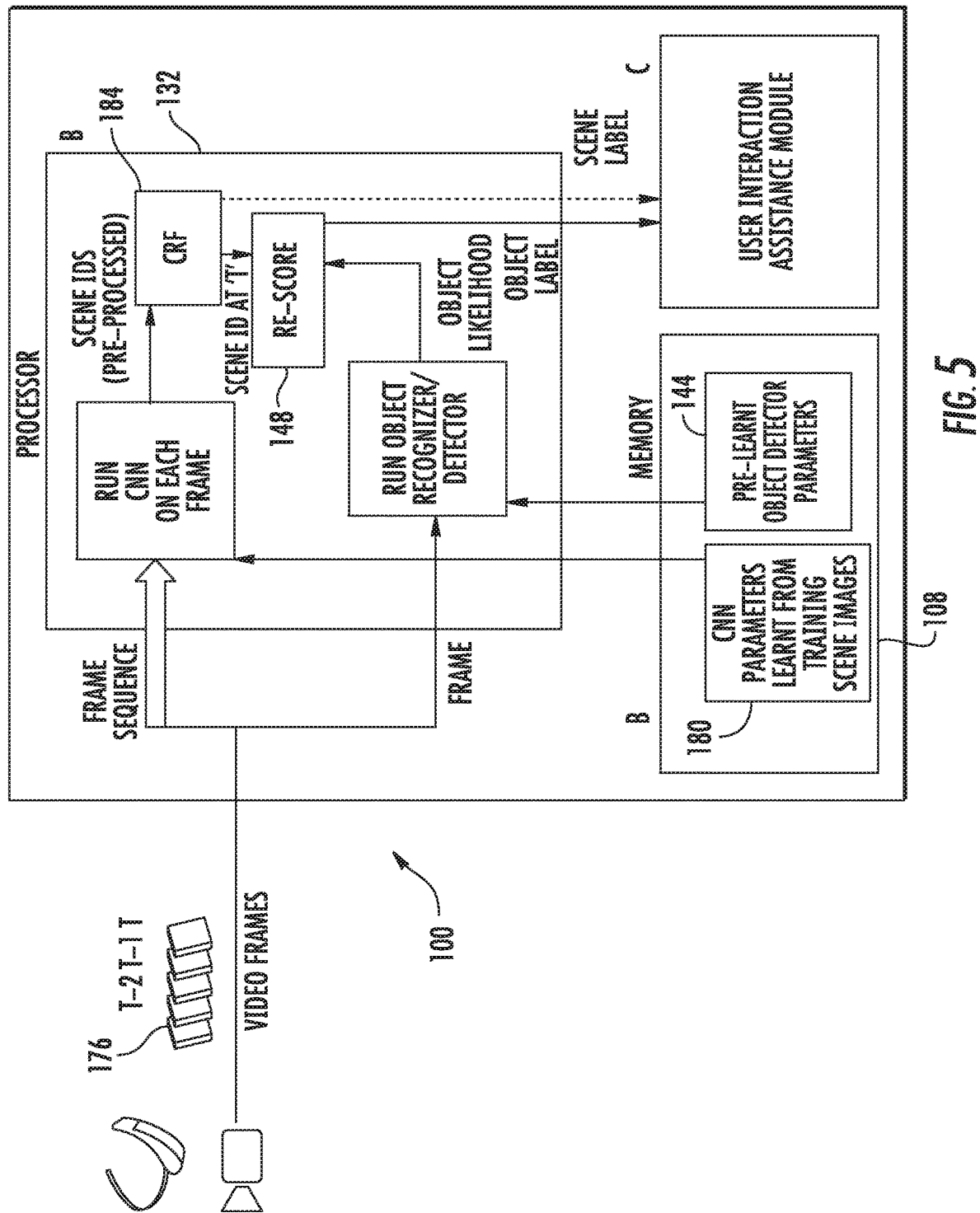
FIG. 5 is a block diagram of a second embodiment of the processor and the memory of FIG. 2.

The memory 108 is an electronic storage device that is configured to store data for operating the vision apparatus 100. In one embodiment, the memory 108 is configured to store scene type data, object identification data, and program instructions. The memory 108 is provided as any desired type of electronic storage medium. An exemplary embodiment of the memory 108 is shown in FIGS. 3 and 5.

The scene type data stored by the memory 108 includes data based on a plurality of scene types in which the vision apparatus 100 is configured for use. Exemplary scene types include kitchen, living room, dining room, family room, studio/room, office, full bathroom, half bathroom, bedroom, corridor, attic, garage, pantry, porch, patio, deck, driveway, classroom, automobile, shopping mall, grocery store, pharmacy, service station, and places and areas that are typically encountered by users performing "everyday" activities. Depending on the embodiment, the vision apparatus 100 may include scene type data for all of the above scene types or only a predetermined selection of the above scene types, depending on at least the capacity of the memory 108 and the intended use of the vision apparatus 100. Alternatively, the scene type data may include data related to scenes that are specialized to a particular individual, industry, or occupation. For example, the scene type data may include data related to scene types such as operating room, patient recovery room, intensive care unit, and the like.

The object identification data stored by the memory 108 includes data based on objects that are typically encountered by users performing "everyday" activities. Additionally, each object identification data is associated with one of the scene types stored by the scene type data. Exemplary objects represented by the object identification data include coffee maker, toilet, telephone, thermostat, and many other types of objects. The coffee maker object identification data, for example, is associated with only the kitchen scene type and the toilet object identification data, for example, is associated with only the various bathroom scene types. Whereas, the telephone object identification data, for example, is associated with at least the kitchen and the office. Thus, each object identification data is associated at least one corresponding scene type in which there is a reasonable likelihood of that object being located. Each object identification data is not associated with scene types in which there is not a reasonable likelihood of that object being located. As an example, the toilet object identification data is not associated with the bedroom scene type, because it is typically unreasonable to locate a toilet in a bedroom.

The program instructions stored in the memory 108 include data that is configured to control operation of the vision apparatus 100. The program instructions are also referred to as a program, an application, or an "app." The program instructions are configured to be executed by the processor 132 during usage of the vision apparatus 100. As described in greater detail below, the program instructions configure the vision apparatus 100 to generate image data, to process the image data, and to generate user sensible output data based on the processed image data.

As shown in FIG. 2, the processor 132 is an electronic unit that is configured to control operation of the vision apparatus 100. The processor 132 is configured to execute the program instructions for operating the components connected thereto. Typically, the processor 132 is powered by a battery or other type of portable source of electrical power (not shown).

Figure 4:
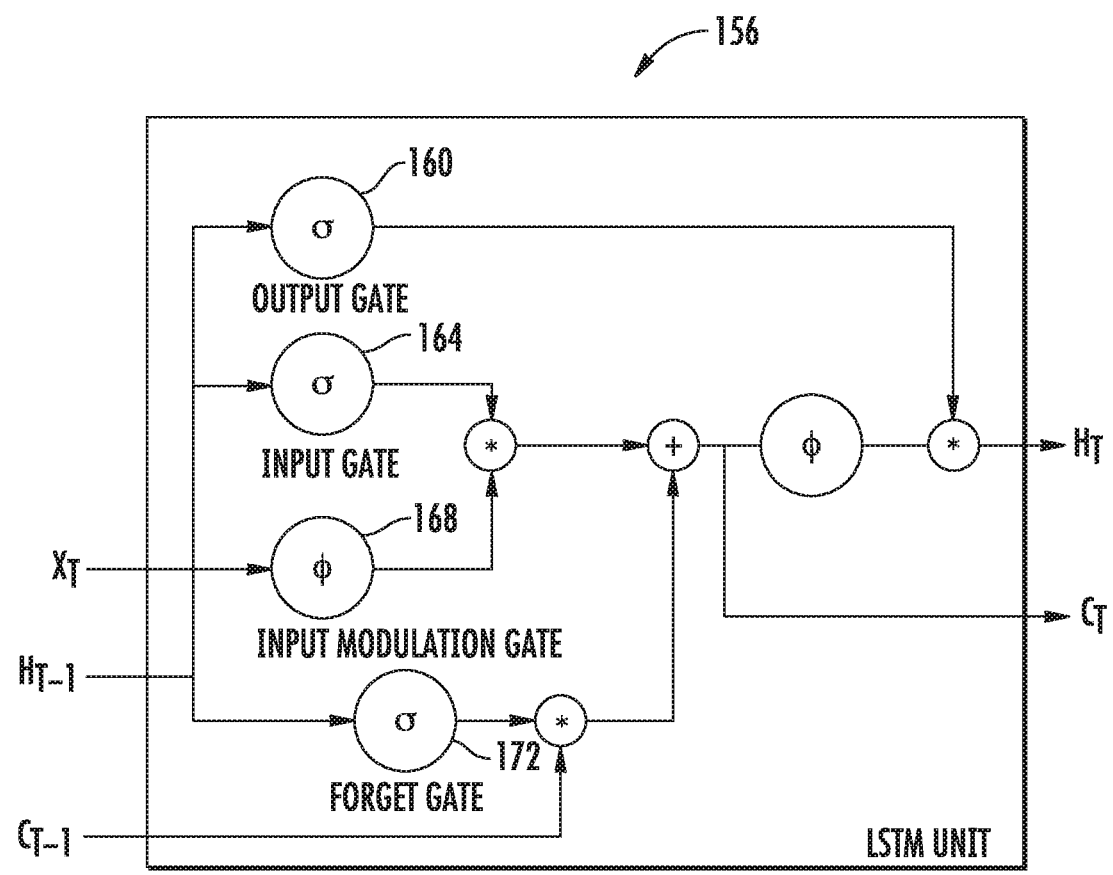
FIG. 4 is a block diagram of an LSTM unit of the LSTM network of FIG. 3.

A first exemplary embodiment of the processor 132 and the memory 108 is shown in FIG. 3. The processor 132 and memory 108 of FIG. 3 are configured without explicit modeling/classification on scene type. To this end, the memory 108 includes logical blocks referred to as a long short-term memory (LSTM) network 140 including parameters learned from videos (hereinafter "LSTM network"), pre-learned object detector parameters 144 (hereinafter "object detector parameters"), a re-scoring algorithm 148, and a clustering algorithm 152. The LSTM network 140 is a recurrent neural network that has learned scene type data from corresponding training videos. An exemplary LSTM unit 156 of the LSTM network 140 is shown in FIG. 4 and includes an output gate 160, an input gate 164, an input modulation gate 168, and a forget gate 172. As shown in FIG. 3, the processor 132 is configured to determine scene type data from a frame sequence 176 of the image data generated by the camera 116 using the LSTM network 140. The processor 132 uses the object detector parameters 144 to generate data that identifies the likelihood that certain objects appear in the frame sequence 176 of imaged data processed by the processor 132. Next, the rescoring algorithm 148 is used to re-score the object data and the scene type data. Also, the scene type data is processed with the clustering algorithm 152. The output of the re-scoring algorithm 148 and the clustering algorithm 152 are used to generate a user sensible output, such data displayed on the display screen 120 or sound emitted by the speaker 124.

A second exemplary embodiment of the processor 132 and the memory 108 is shown in FIG. 5. The processor 132 and the memory 108 are configured with explicit modeling/classification on scene. For example, the processor 132 and the memory 108 are configured using convolutional deep neural networks (CNN) followed by a conditional random field (CRF) for refinement leveraging spatio-temporal constraints. The memory 108 includes a logical block referred to as a CNN algorithm 180 including parameters learned from training scene images, pre-learned object detector parameters 144 (hereinafter "object detector parameters"), a CRF algorithm 184, and the re-scoring algorithm 148. The processor 184 processes the frame sequence 176 of the image data generated by camera 116 with the CNN algorithm 180 and generates an output that is processed using the CRF algorithm 184. Then the output of the CRF algorithm 184 and the output of the object detector parameters 144 are re-scored using the rescoring algorithm 148. The processor 132 uses the output of the rescoring algorithm 148 to generate a user sensible output, such data displayed on the display screen 120 or sound emitted by the speaker 124.

Figure 6:
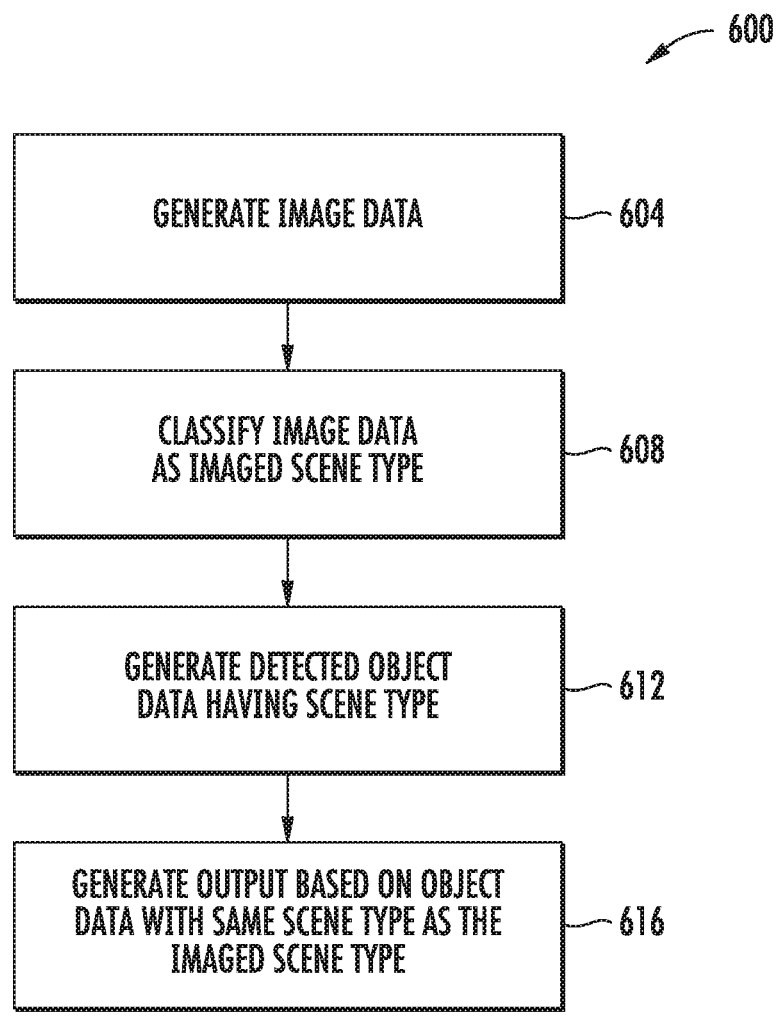
FIG. 6 is a flowchart illustrating an exemplary method of operating the vision apparatus of FIG. 1.

In operation, the vision apparatus 100, in one embodiment, performs the method 600 of discriminating detected objects illustrated by the flowchart of FIG. 6. For example, with reference to FIG. 11, the vision apparatus 100 is positioned in an area 200 including a plurality of objects 204, 208, 212. The vision apparatus 100 is configured to accurately identify at least some of the objects 204, 208, 212 located in the area 200 by using contextual information from the area 200 in which the objects 204, 208, 212 are located. That is, for example, the vision apparatus 100 has determined that a refrigerator object 216 and a tv object 204 are located in the area 200 which has been classified an office scene type. The refrigerator object 216 and the tv object 204 are rendered object detection data. As shown in FIG. 12, the vison apparatus 100 determines that the office should not include the refrigerator object 216 and should include the tv object 204, because refrigerators are not typically located in an office, but a tv is suitable for an office.

As shown in block 604, the processor 132 processes the program instructions to generate image data of a portion of an area using the camera 116. In one embodiment, the generated image data includes a plurality of "frames" of images. The image data is color image data, such that a color representation of the portion of the area and the objects therein are generated. The image data may be generated with the vision apparatus 100 being held by the user, with the vision apparatus 100 located in a fixed position, or with the vision apparatus 100 mounted to the body of the user.

Next, as shown in block 608, the processor 132 executes the program instructions stored in the memory 108 to classify the image data as an imaged scene type selected from the plurality of scene types stored as the scene type data in the memory 108. For example, in one embodiment, the processor 132 processes the plurality of frames of the image data and classifies each processed frame with a scene type selected from the plurality of scene types. The processor 132 determines the selected scene type as the scene type most frequently classified during the processing of the plurality of frames. That is, in processing a few seconds worth of image data the processor 132 may determine that seventy percent of the frames correspond to the bedroom scene type, twenty percent of the frames correspond to the bathroom scene type, and ten percent of the frames correspond to the kitchen scene type. From this, the processor 132 determines that all of the processed frames correspond to the bedroom and selects the bedroom scene type as the imaged scene type because the bedroom scene type is classified with the most frequency.

In assigning a particular frame with a corresponding scene type, in one embodiment, the processor 132 assigns each processed frame of image data with a scene score for each scene type of the plurality of scene types stored in the memory 108. Accordingly, if the memory 108 stores thirty scene types then each frame of image data receives up to thirty corresponding scene scores. The scene score is indicative of a probably that the corresponding frame corresponds to a particular scene type. The selected scene type of each frame is selected as the scene type corresponding to the highest scene score.

In block 612, the processor 132 processes the image data using the object identification data to generate object detection data for each object of the plurality of objects located in the portion of the area. Using to the object identification data stored in the memory 108, the processor 132 assigns each object detection data with a corresponding scene type of the plurality of scene types. Accordingly, if the processor 132 determines that the image data includes a refrigerator, the processor 132 assigns the refrigerator object detection data the scene type "kitchen," because refrigerators are most frequently located in the kitchen.

In an exemplary embodiment, such as an embodiment including the processor 132 and memory 108 shown in FIG. 3, the processor 132 processes a plurality of frames of the image data to generate image descriptor data for each processed frame. The image descriptor data is representative of the objects located in the portion of the area that is being imaged by the camera 116. Then the processor 132 processes each image descriptor data through the LSTM network 140 stored in the memory 108 to arrive at the object detection data. As noted above, the LSTM network 140 is trained to identify the objects of the plurality of objects.

Figure 7:
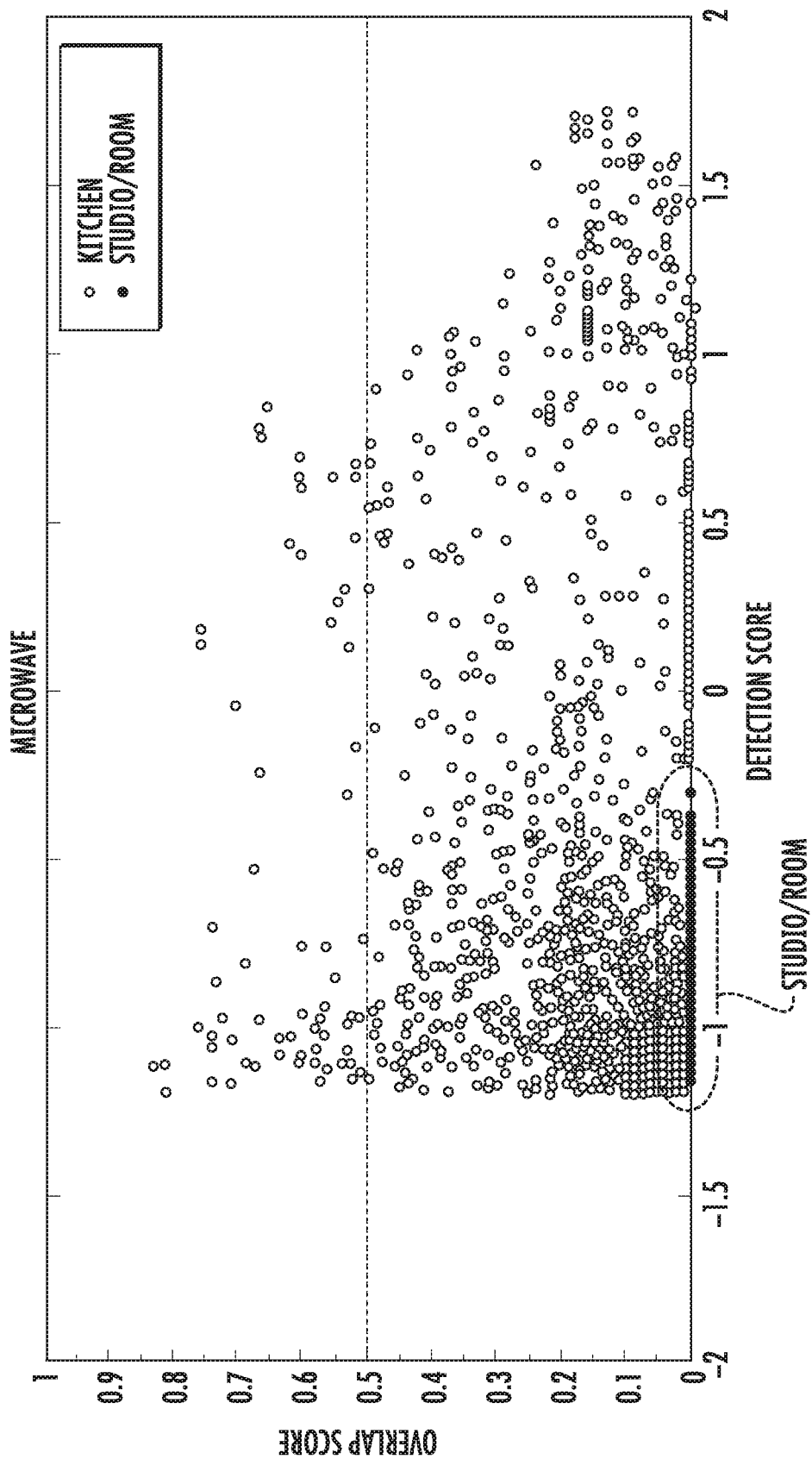
FIG. 7 is a graph of overlap score versus detection score for object detection data of a microwave, the graph includes object detection data having a kitchen scene type and object detection data having a studio/room scene type, the studio/room type object detection data is circled and is un-shifted.
Figure 8:
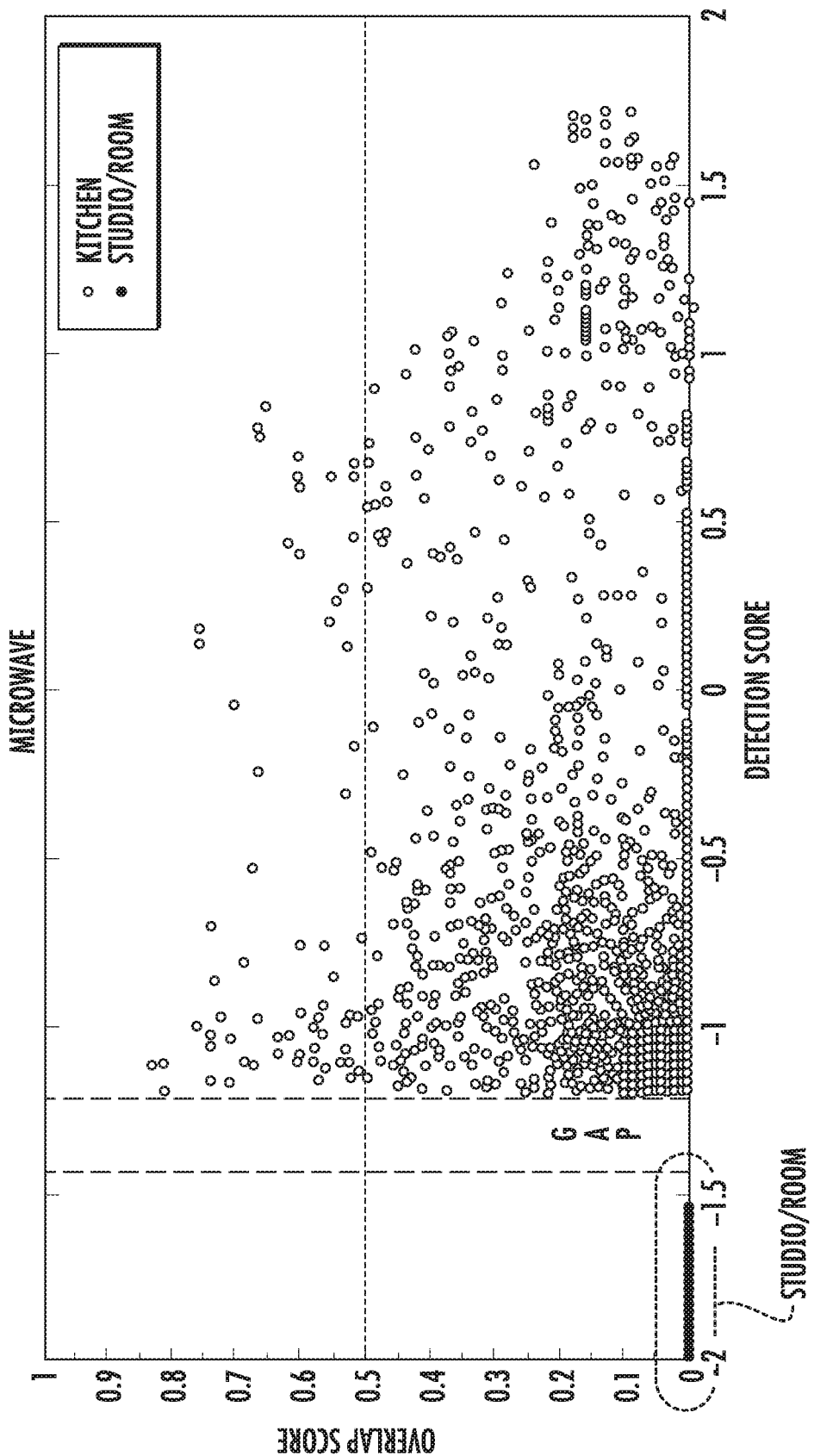
FIG. 8 is a graph of overlap score versus detection score for object detection data of a microwave having the studio/room type object detection data shifted by a predetermined value away from the object detection data having a kitchen scene type.

As shown in FIGS. 7 and 8, in another exemplary embodiment, generating the object detection data from a plurality of processed frames of the image data includes assigning each object detection data a detection score, an overlap score, and a scene type. Each object detection data is represented as a point in the graphs. The detection score represents the probability of the object detection data corresponding to a particular object that could be located in the area. The overlap score is based on the location of the detected object within the frame of image data. The scene type for each object detection data is selected based on the scene type of the frame of image data from where the object detection data originated. In FIGS. 7 and 8, most of the points represent object detection data of a microwave located in the kitchen. A circled subset of points represents object detection data of a microwave from frames of imaged data assigned the studio/room scene type. The circled subset of points is shown without an overlap score for clarify of viewing. As shown in FIG. 7, the detection scores of the circled subset of points overlaps with the detection scores of the microwave/kitchen points, thereby affecting the accuracy of the object detection. Accordingly, as shown in FIG. 8 in order to more accurately detect the objects, the processor 132 shifts the detection scores of the detected object data that do not correspond to the kitchen scene type by a predetermined value. The shift in data uses context of the area to isolate the object detection data that corresponds to the scene type in which the detected object is most probably located. Accordingly, the processor 132 utilizes the detection scores that are most likely valid without the false positive detection scores of the studio/room scene type data interfering with the results.

In one embodiment, the magnitude of the predetermined value of shifting is selected as a difference between a lowest detection score of the object detection data having a corresponding scene type that is the same as the imaged scene type and a highest detection score of the object detection data having a having a corresponding scene type that is different from the imaged scene type plus a fixed value. The fixed value ensures that the "gap" shown in FIG. 8 is present between the object detection data with an accurate scene type (right of the gap) and the object detection data with an inaccurate scene type (left of the gap).

As shown in block 616 of the flowchart of FIG. 6, the processor 132 generates an output that is sensible to the user only in response to the object detection data having a corresponding scene type that is the same as the imaged scene type. For example, in embodiments of the vision apparatus 100 including the speaker 124, the processor 132 processes the program instructions to generate an audio signal for each object detection data having a corresponding scene type that is the same as the imaged scene type. The processor 132 sends the audio signal to the speaker 124, such that objects detected by the vision apparatus are announced in a user understandable format by the speaker 124. In embodiments of the vision apparatus 100 including the display screen 120, the processor 132 processes the program instructions to generate a display signal for each object detection data having a corresponding scene type that is the same as the imaged scene type. The processor 132 sends the display signal to the display screen 120, such that objects detected by the vision apparatus are rendered on the display screen 120 in a user understandable format.

Figure 9:
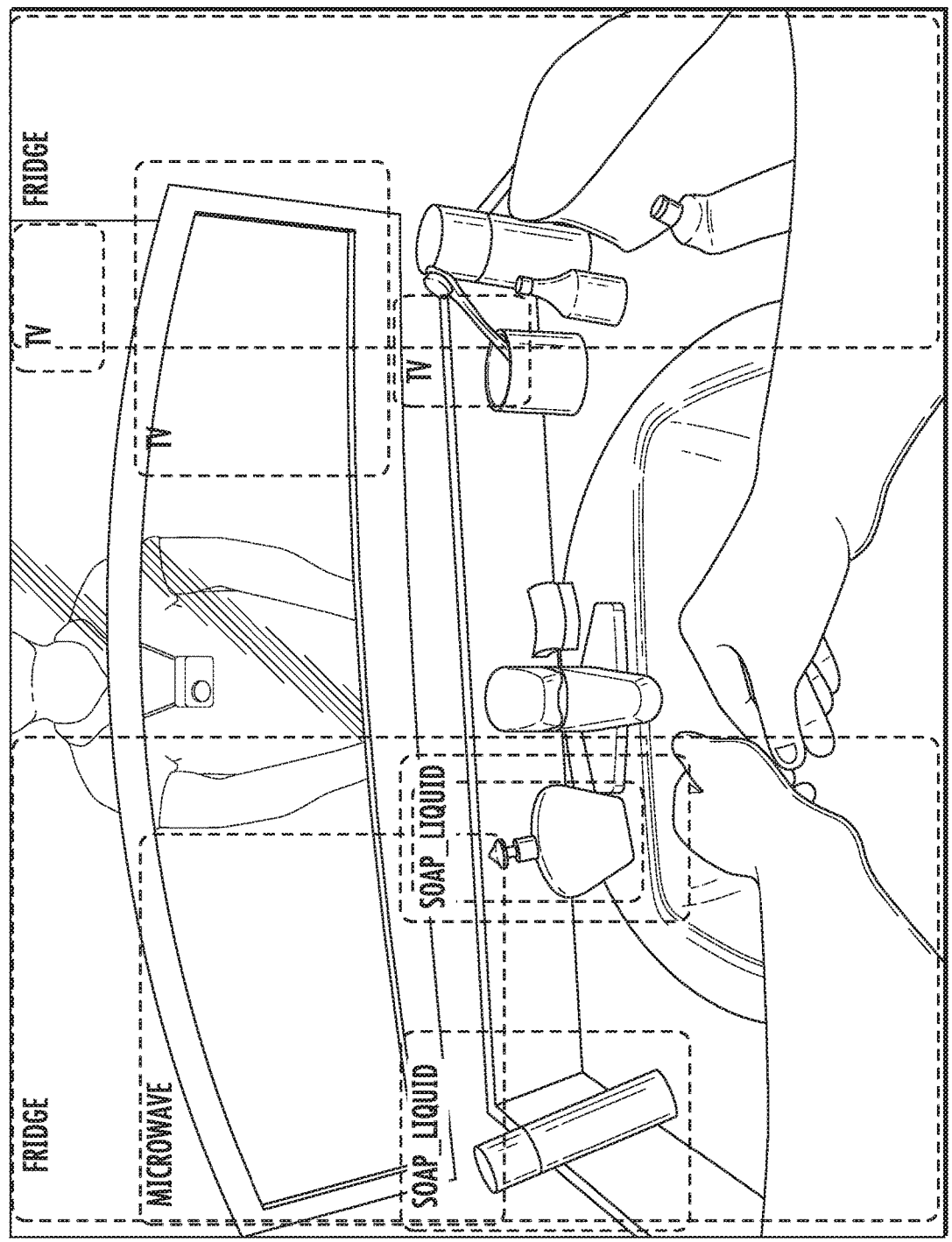
FIG. 9 shows a frame of image data that has been annotated with object detection data, the image data illustrating an area including a plurality of objects.
Figure 10:
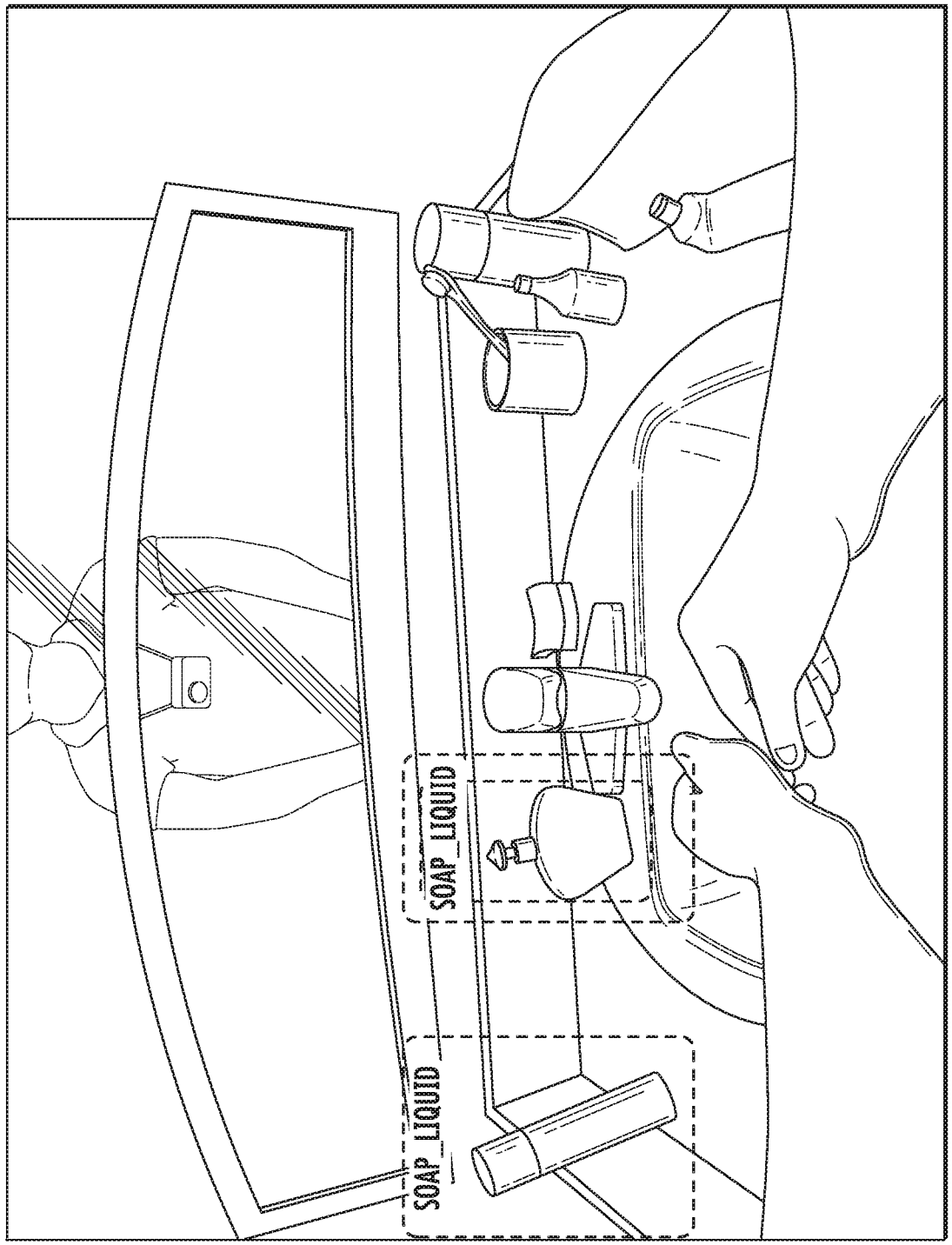
FIG. 10 shows the frame of image data of FIG. 9 after generating a user sensible output only for the object detection data that has the same scene type as the scene type of the image data.

FIGS. 9-20 illustrate this process of discriminating object data based on the context of the area in which the vision apparatus is located. In FIGS. 9 and 10, the image data corresponds to a bathroom. In FIG. 9, the processor 132 has rendered the image data and a plurality object detection data on the display 120. As shown, not all of the identified objects typically correspond to the bathroom, such as microwave, the tv, and the fridge. Thus, FIG. 9 represents the objects detected without taking into account the context of the area. In FIG. 10, the objects have been discriminated to only identify the objects that correspond to the imaged scene type, i.e. the bathroom. Accordingly, the object detection data corresponding to the microwave, the tv, and the fridge are not rendered in FIG. 10 because those object detection data correspond to the kitchen scene type, not the bathroom scene type.

Figure 11:
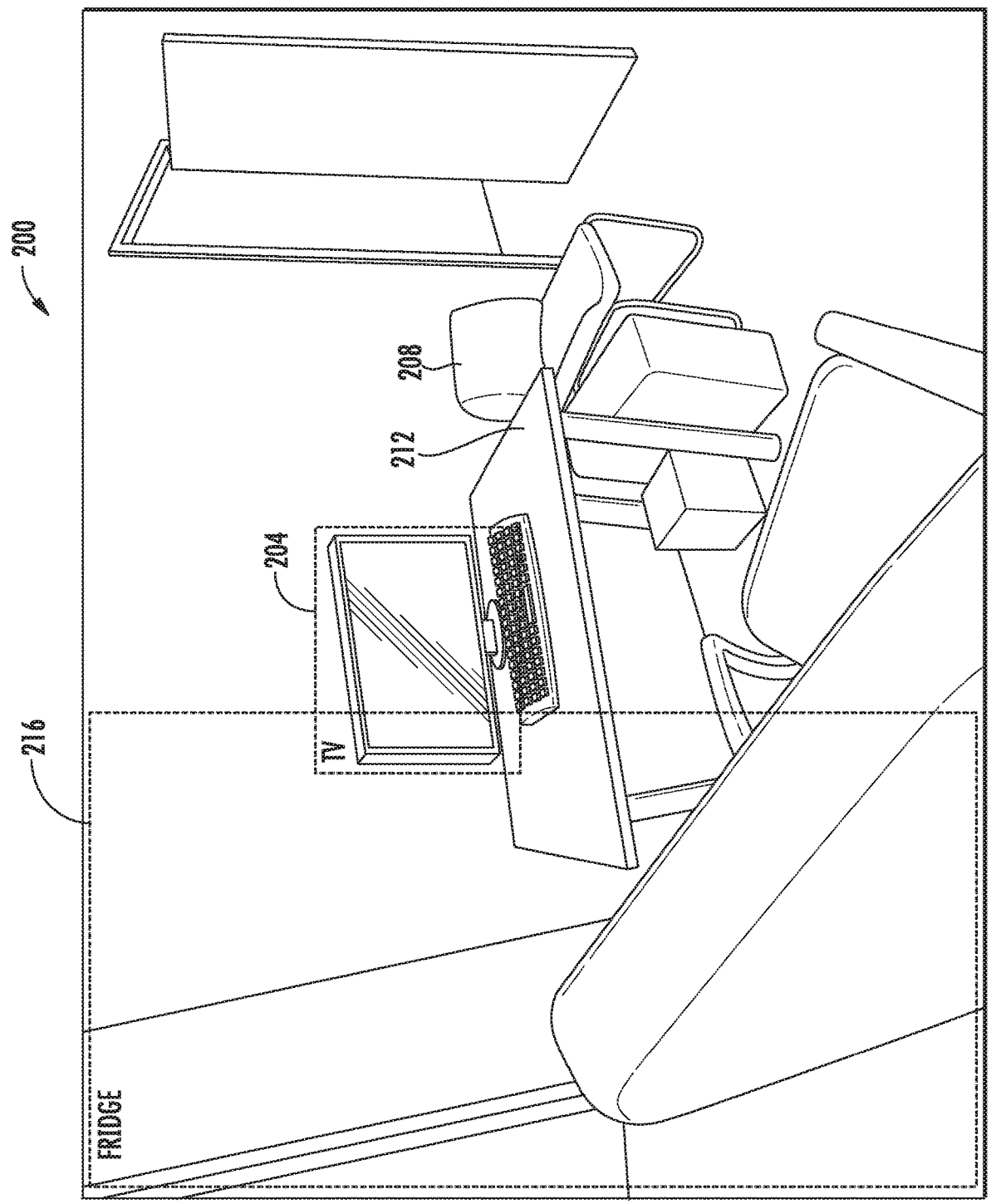
FIG. 11 shows a frame of image data that has been annotated with object detection data.
Figure 12:
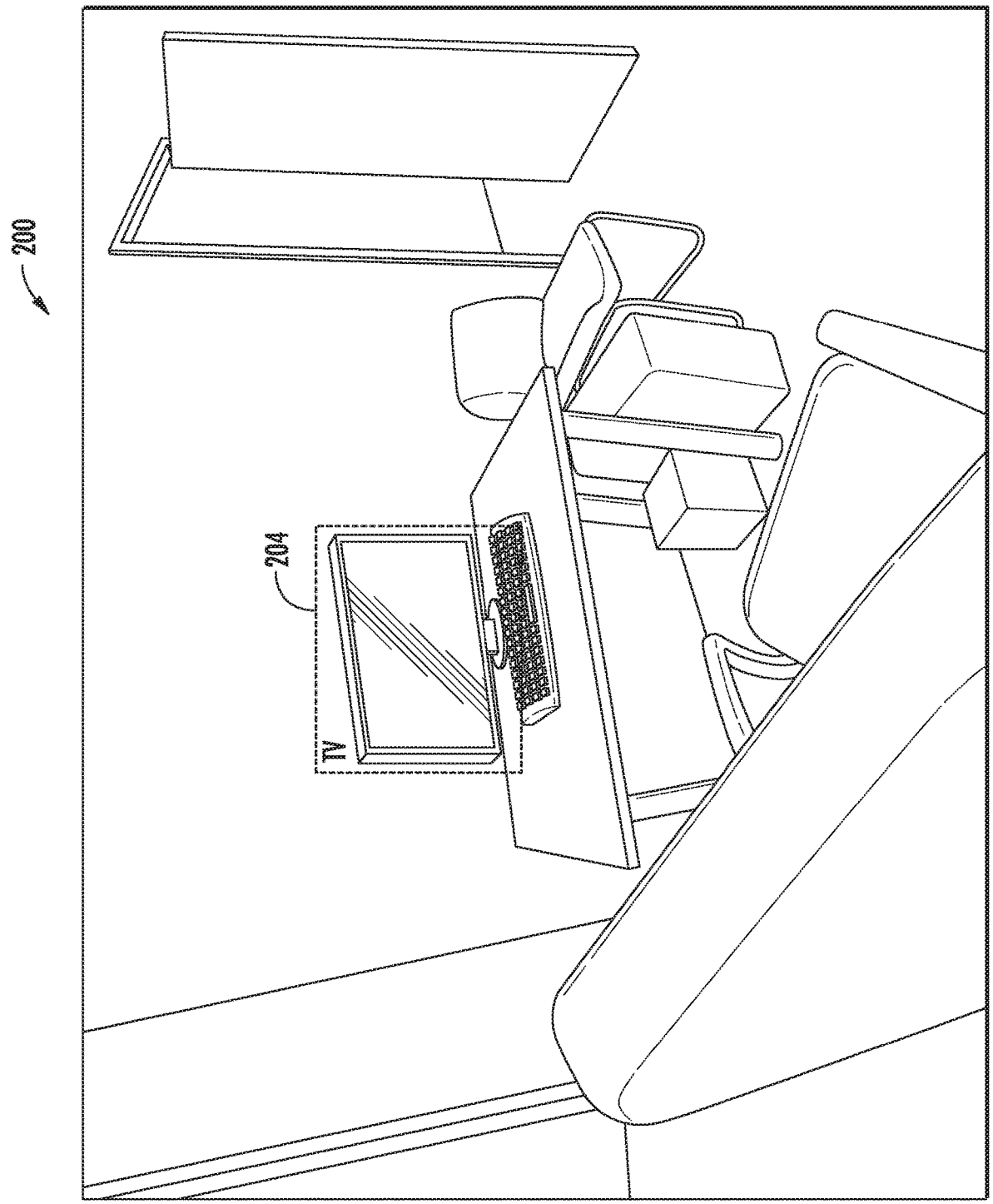
FIG. 12 shows the frame of image data of FIG. 11 after generating a user sensible output only for the object detection data that has the same scene type as the scene type of the image data.

In FIGS. 11 and 12, the imaged scene type is an office. In FIG. 11, the object detection data includes a refrigerator and a tv; however, in FIG. 12, the detected refrigerator is not rendered because the refrigerator is not associated with the imaged scene type. The object detection data of the tv is rendered because the tv has the same scene type as the imaged scene type.

Figure 13:
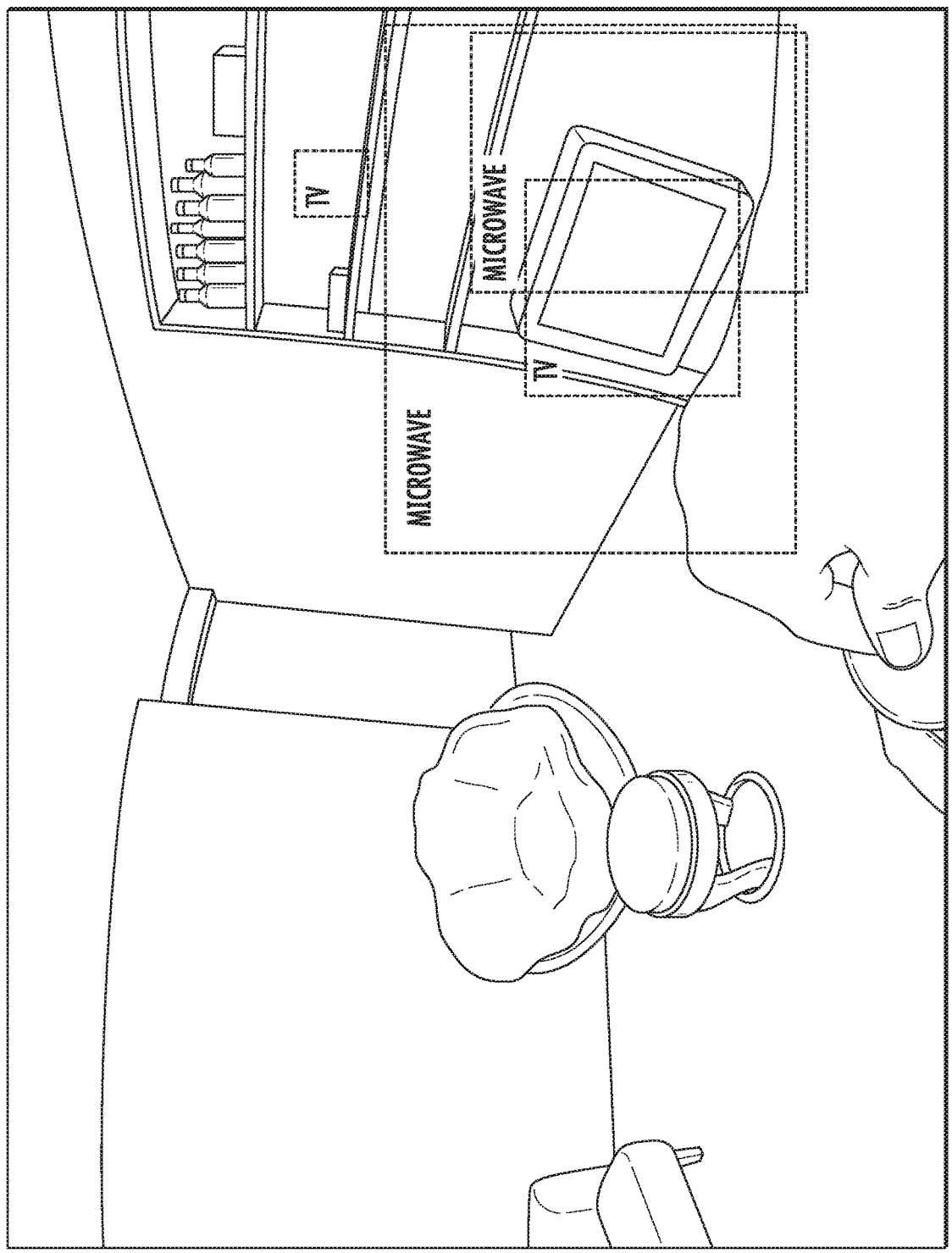
FIG. 13 shows a frame of image data that has been annotated with object detection data.
Figure 14:
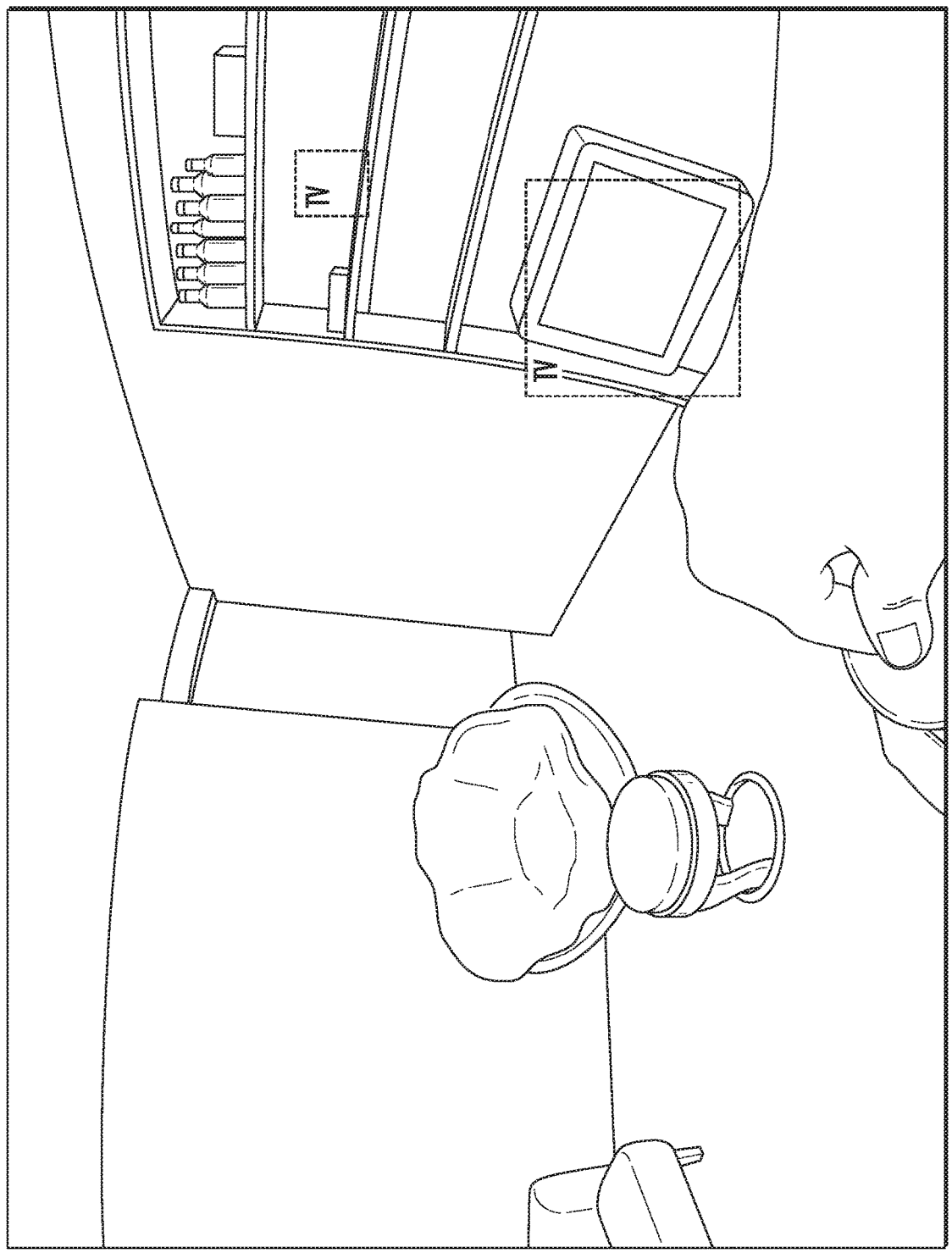
FIG. 14 shows the frame of image data of FIG. 13 after generating a user sensible output only for the object detection data that has the same scene type as the scene type of the image data.

In FIGS. 13 and 14, the imaged scene type is a living room. In FIG. 13, the object detection data includes a tv and two microwaves which are shaped very similarly to a tv. Thus, most object detection systems would not be able to discriminate between a tv and microwave without analyzing in extreme detail the image data for specific difference between the two objects. However, in FIG. 14, the vision apparatus 100 uses the context of the area to determine that the detected microwaves do not actually represent a microwave in the image data, because microwaves not associated with the imaged scene type; thus, the object must be a tv.

Figure 15:
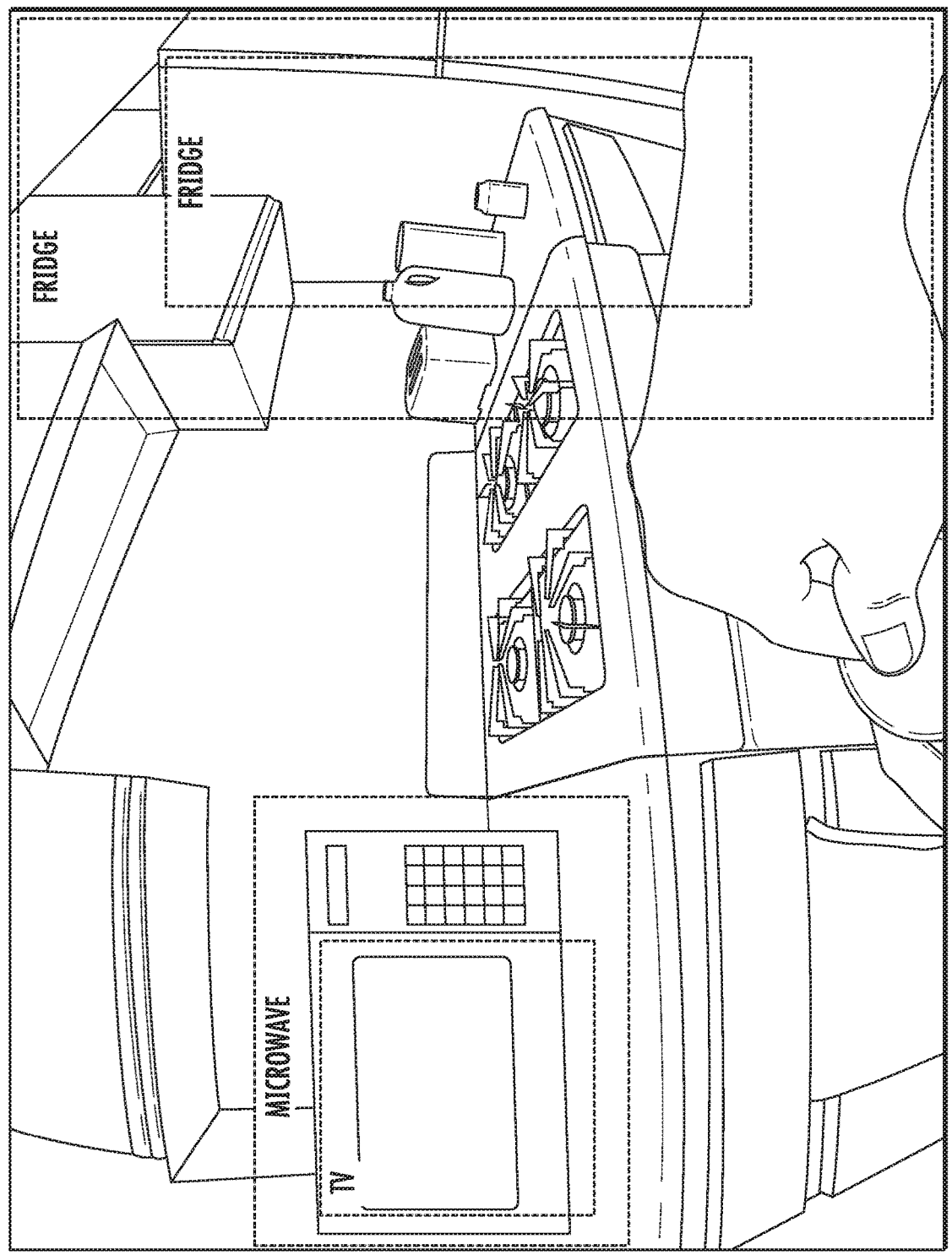
FIG. 15 shows a frame of image data that has been annotated with object detection data.
Figure 16:
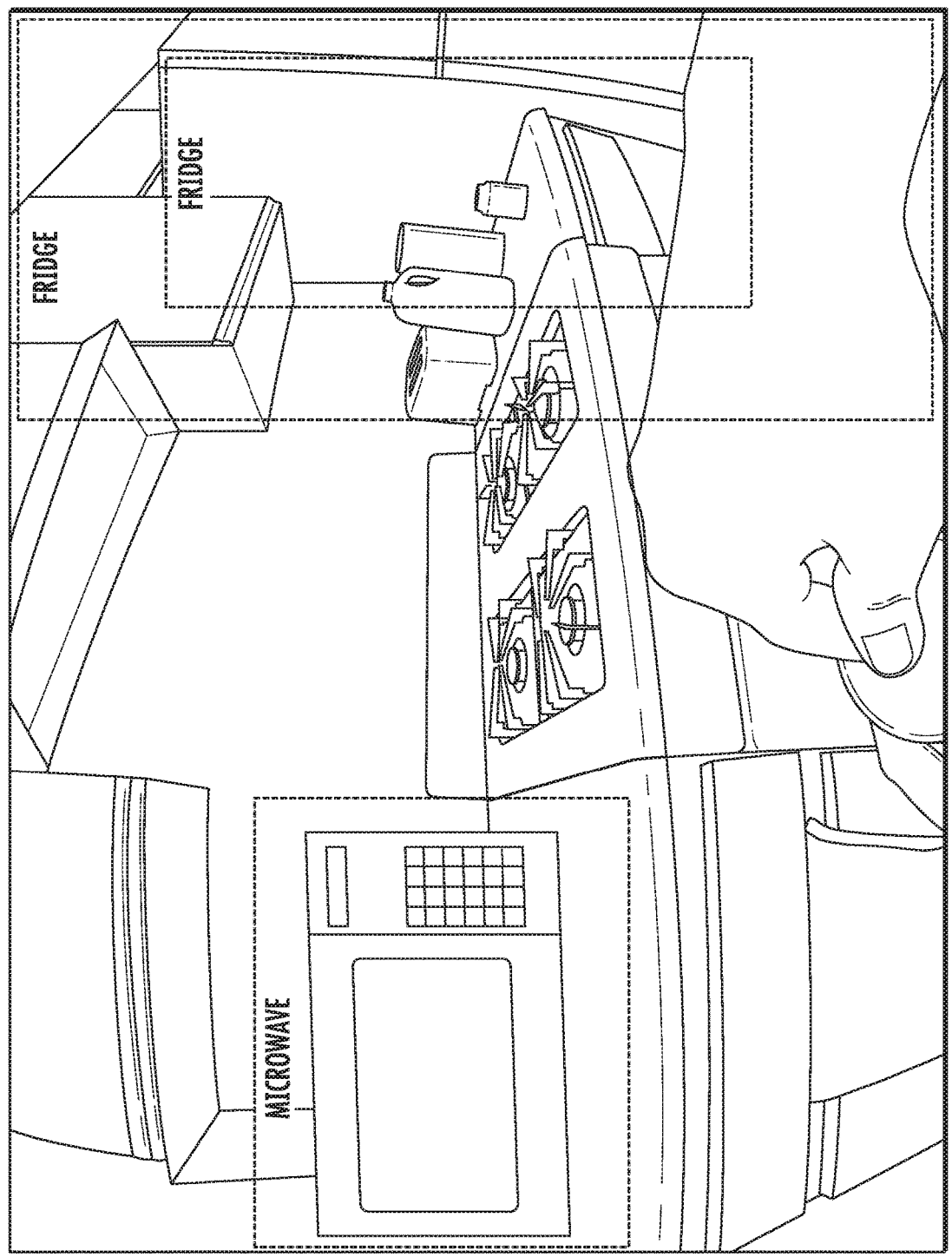
FIG. 16 shows the frame of image data of FIG. 15 after generating a user sensible output only for the object detection data that has the same scene type as the scene type of the image data.

In FIGS. 15 and 16, the imaged scene type is a kitchen. In FIG. 15, the object detection data includes a tv, two refrigerators, and a microwave; however, in FIG. 16, the detected tv is not rendered because the tv is not associated with the imaged scene type.

Figure 17:
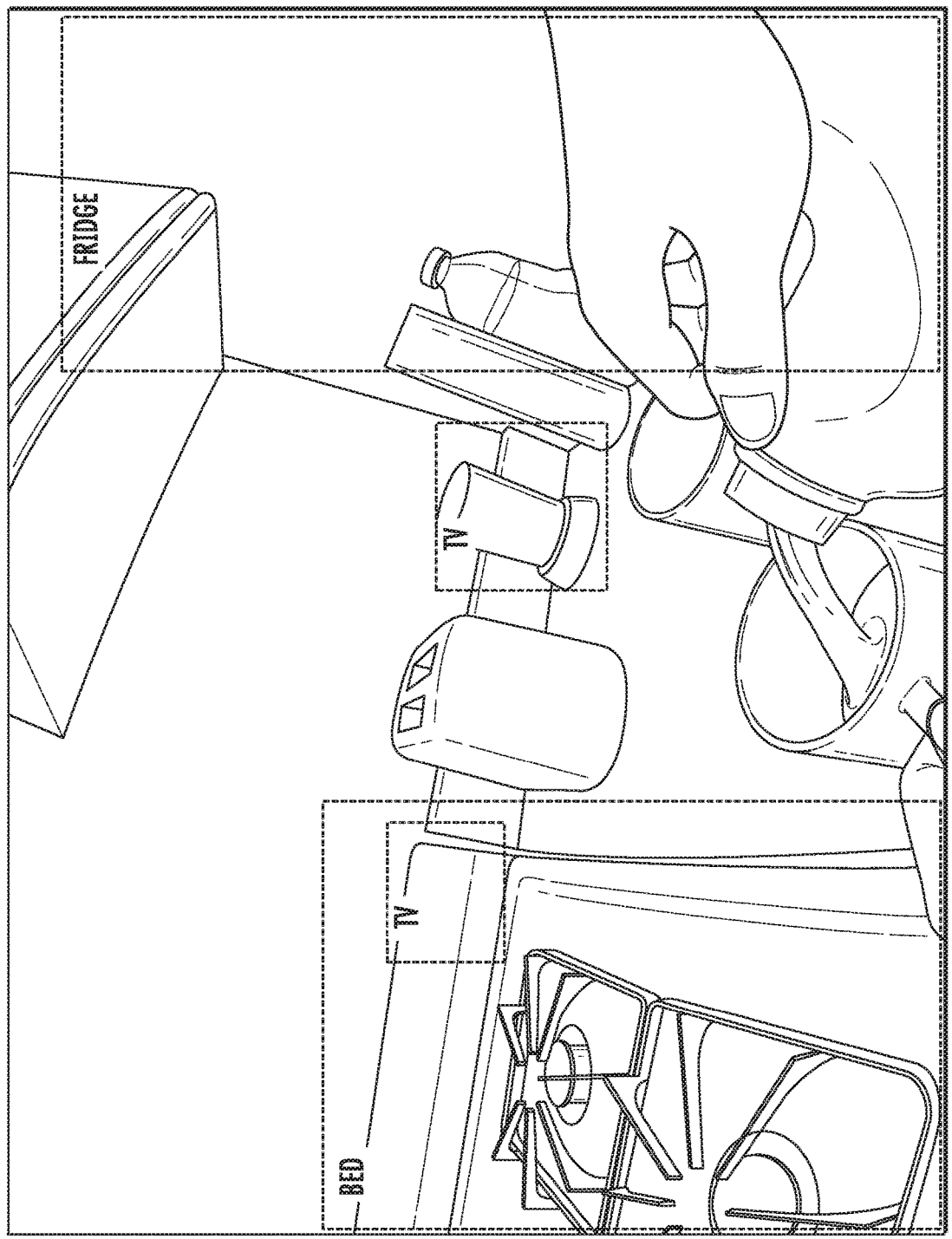
FIG. 17 shows a frame of image data that has been annotated with object detection data.
Figure 18:
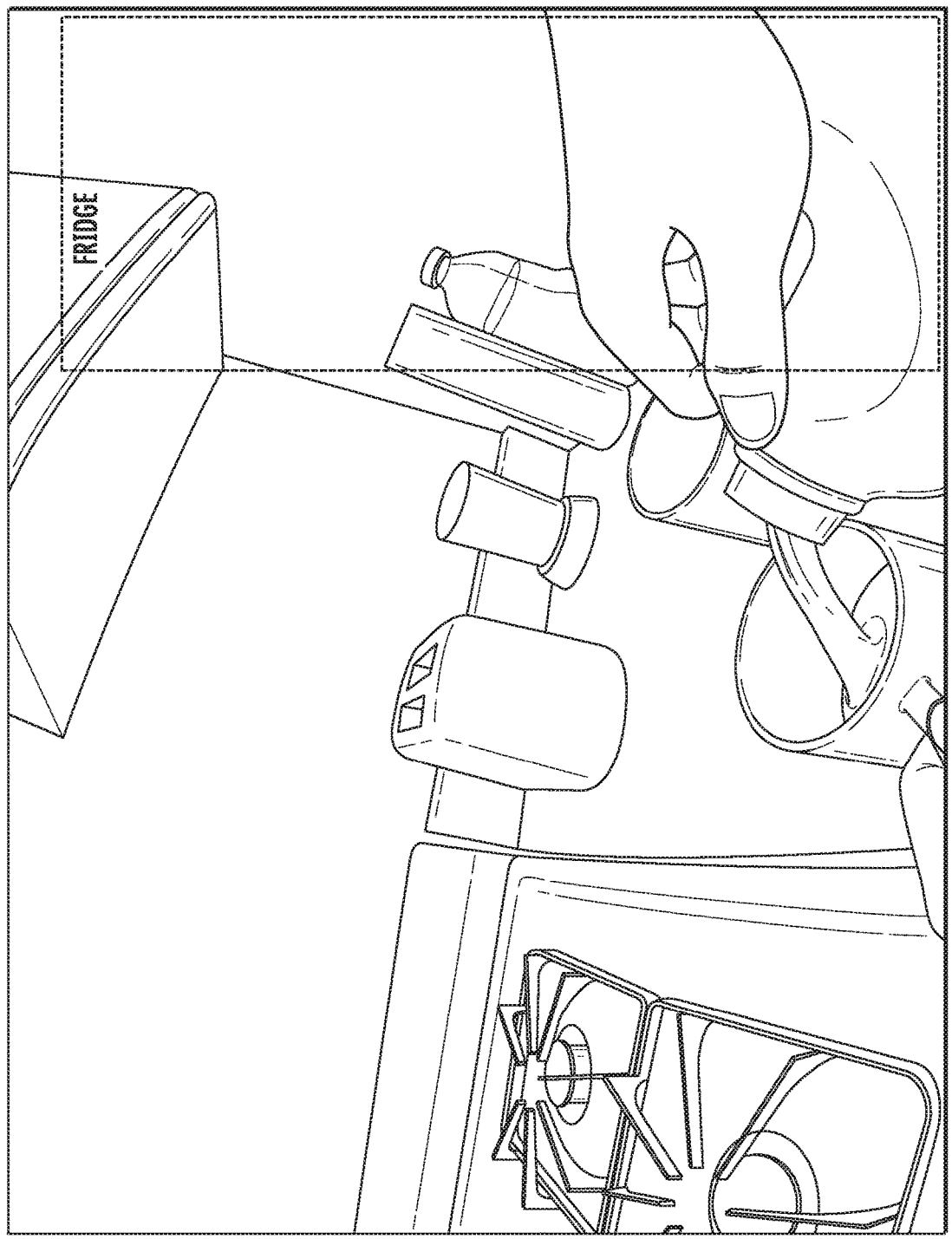
FIG. 18 shows the frame of image data of FIG. 17 after generating a user sensible output only for the object detection data that has the same scene type as the scene type of the image data.

In FIGS. 17 and 18, the imaged scene type is a kitchen. In FIG. 17, the object detection data includes a tv, a bed, and a refrigerator; however, in FIG. 16, the detected tv and bed are not rendered because the tv and bed are not associated with the imaged scene type.

Figure 19:
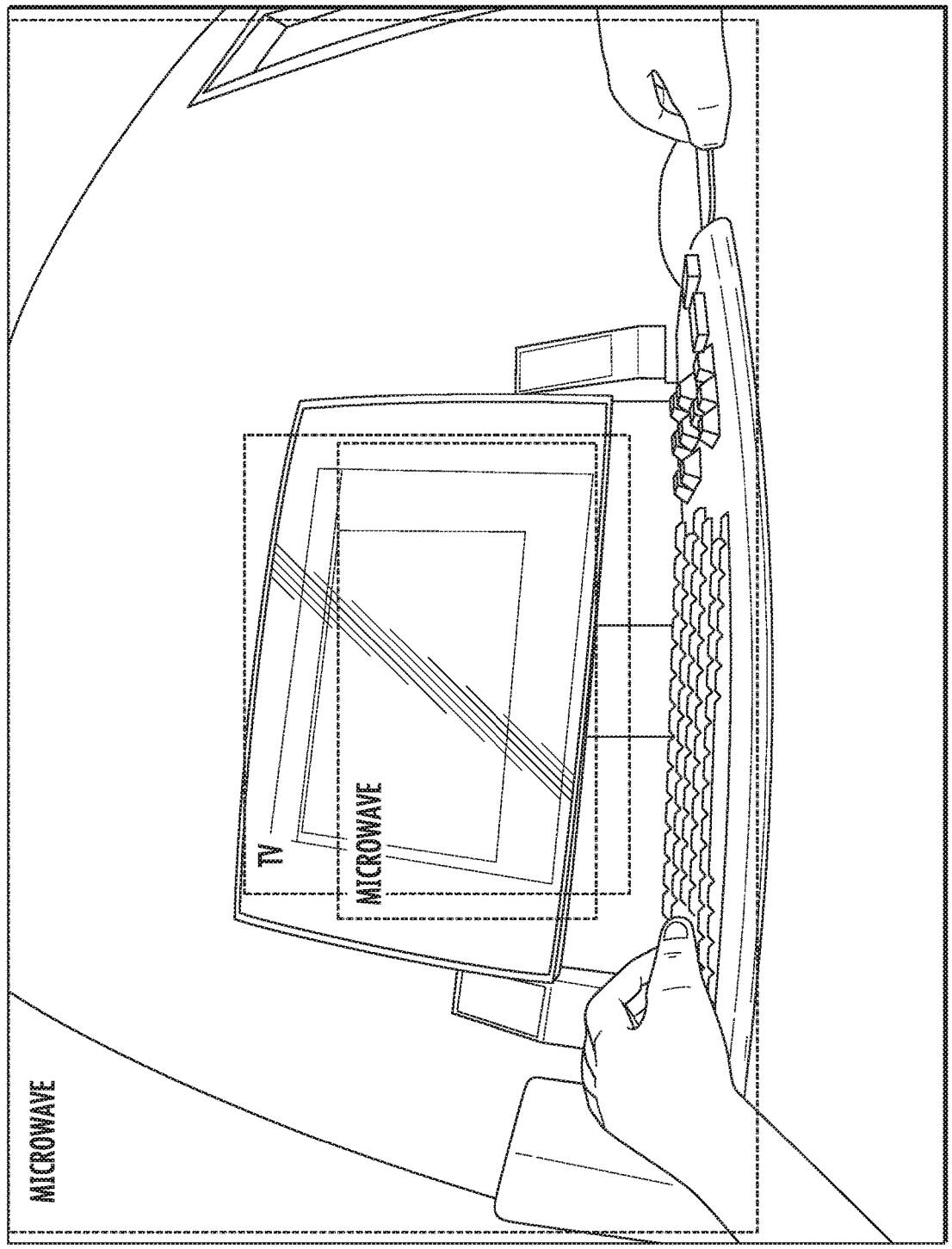
FIG. 19 shows a frame of image data that has been annotated with object detection data.
Figure 20:
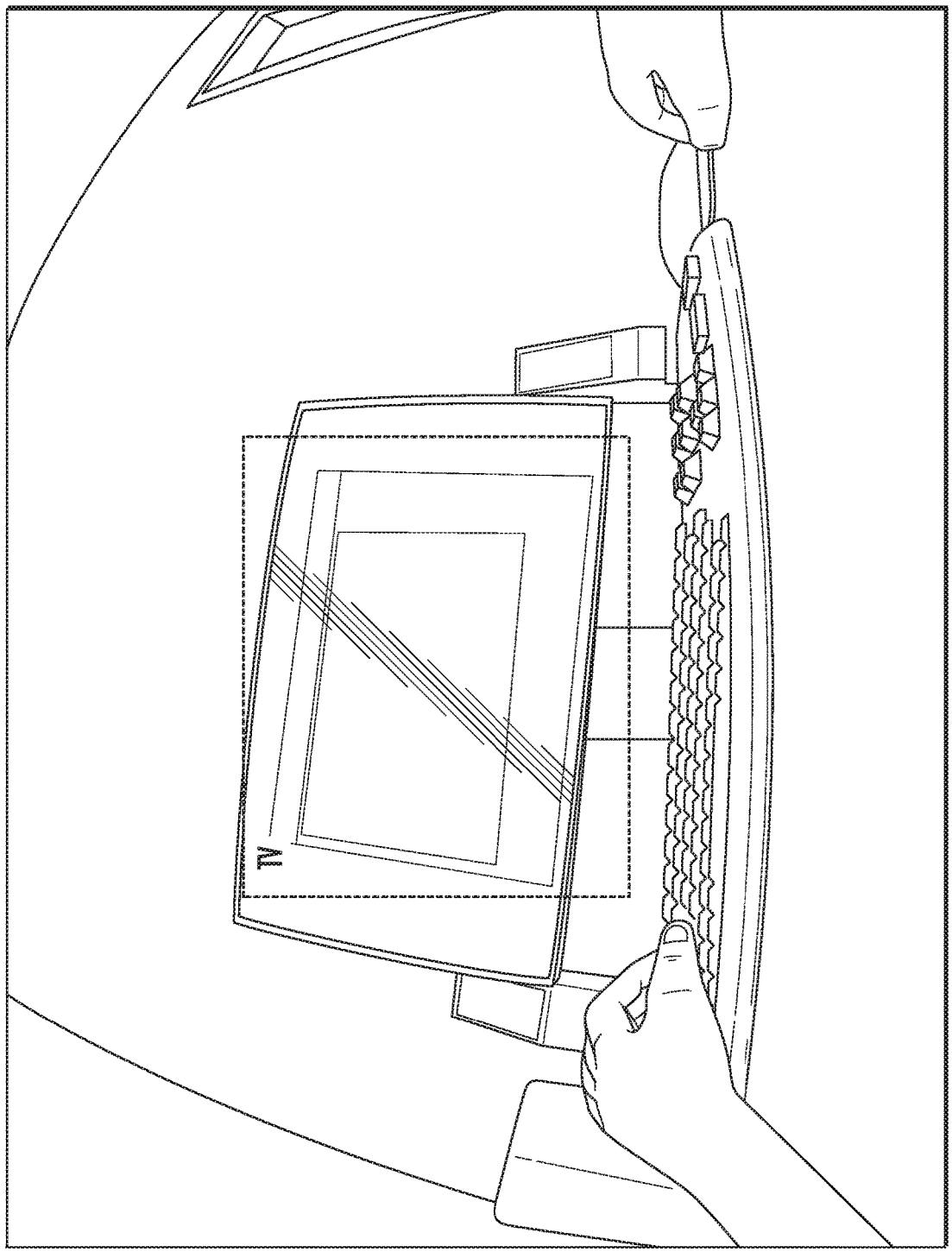
FIG. 20 shows the frame of image data of FIG. 19 after generating a user sensible output only for the object detection data that has the same scene type as the scene type of the image data.

In FIGS. 19 and 20, the imaged scene type is an office. In FIG. 19, the object detection data includes two microwaves and a tv; however, in FIG. 12, the detected microwaves are not rendered because the microwaves are not associated with the imaged scene type.

The disclosure provided below includes additional information related to at least one embodiment of the vision apparatus 100. The nature of egocentric vision implies that the location where the activity is performed remains consistent for several frames of the image data. Daily activities are performed in prototypical scenes that share a lot of visual appearance independent of who recorded the video and where the video was recorded. Thus, the egocentric scene identification is improved by taking context, and specifically location and time, into account. Moreover, since most objects are typically associated to particular types of scenes, a generic object detection method is improved by re-scoring the results of the object detection method, according to the scene content.

With regards to scene identification, temporal constraints can be exploited to improve frame level scene identification performance. The location where an activity is performed remains consistent for several frames of image data until the user changes the location. Given a frame of image data, several trained scene classifiers are evaluated and a decision about the identity of the scene is made based on the classification scores.

Object detection tasks attempt to find the location of objects in a frame of image data. Traditional approaches use human labeled bounding boxes of objects as positive training data, while visual features that are not included in the positive training bounding box makes part of the negative data. However, as shown in FIG. 21 the objects are part of a kitchen scene type. Thus, from a list of possible objects to look for, the typical user understands that some types of objects are unlikely to be found in this particular context such as the smartphone (first image), the desk phone (third image), and the thermostat (fourth image), while a coffee-maker (second image) is an object that most likely can be found in this scene type. Current object detection systems do not account for context in this manner; however, the vision apparatus 100 is configured to account for this type of context to simplify image detection and to optimize the amount of processing required to detect objects in image data.

The vision apparatus works well during Activities of Daily Living (ADL) where most of first person activities are performed in a few prototypical scenes that are common to all the actors. ADLs are typically extremely challenging scenarios for object detection since the objects suffer from notable changes on appearance due to radial distortion, pose change, and actor influence over the object. The vision apparatus improves object detection by re-scoring the results of the object detection method in favor of objects that are most probably present according to the scene type content. In one embodiment, the vision apparatus uses a simple formulation to manage the case where the labels of the test videos are directly predicted from models learned in training data, and also a formulation based on Long Short-Term Memory (LSTM) that directly infers the probability of having a type of object in a sequence, without an explicit knowledge of the label of the scenes.

Thus, the some exemplary benefits of the vision apparatus include using temporal consistency constraints to improve scene identification accuracy in egocentric video by means of a Conditional Random Field (CRF) formulation, and using a methodology to improve indirectly object detection results by modifying the object detection scores according to the identified scene type. The vision apparatus is even able to accurately detect objects in the case of unknown scene types using the LSTM formulation, which is configured to predict how likely an object will be present in the current frame of the sequence allowing a re-scoring of the object detection results.

Egocentric vision is a relatively recent trend in the computer vision community. Improvement in object detection has been fueled mainly by the PASCAL VOC competition, and more recently by ImageNet Large Scale Visual Recognition Challenge (ILSVRC). An extensive analysis of the results of the different competitions on PASCAL VOC challenge during years 2008 to 2012 was recently published by their organizers. From there, it is clear that the reference method for object detection in VOC 2008-2012 was the deformable part model (DPM) which won the detection contest in 2008 and 2009. DPM model uses histogram of oriented gradients representation (HOG) to describe a coarse scale root filter and a set of nerscale part templates that can move relative to the root. In testing time, the model is applied everywhere in the image (and different scales) using sliding window technique. A huge gain in performance was achieved using a combination of selective search and Convolutional Neural Networks (CNN). The vision apparatus 100 described herein, in one embodiment, uses a Convolutional Neural Network that was trained by Krizhevsky et al. for the ImageNet (ILSVRC) classification challenge; however, a fine tuning in the fully connected layers of the network was performed in order to adapt domain to the PASCAL VOC dataset.

Scene identification is essentially an image classification problem with a domain specific type of images. Over many years approaches based on the Bag of Words paradigm were the dominant state of the art. Further improvement was achieved by including spatial information using pyramids in association with new types of encoding. Huge improvements have been obtained in classification and detection (almost double in less than 2 years according to the comprehensive evaluation of the ILSVRC challenge) after the generalized use of Convolutional Neural Networks (CNN). Most of these approaches are based on extension of the Convolutional Neural Network trained by Krizhevsky for the ILSVRC classification challenge. A number of recent works has shown that CNN features trained on sufficiently large and diverse datasets, can be successfully transferred to other visual recognition tasks such as scene classification and object localization, with a only limited amount of task-specific training data. The current state of the art for scene classification, encodes together global CNN features by concatenating multiple scale levels CNN features pooled by orderless Vector of Locally Aggregated Descriptors (VLAD). The vision apparatus 100 improves upon the current state of the art by considering intrinsic temporal constraints of egocentric video (i.e. image data). Specifically, the vision apparatus 100 improves scene identification by using temporal information, and improves the object-detection through the use of the scene visual appearance. The vision apparatus 100 uses the egocentric video temporal consistency constraint to improve scene identification accuracy by means of a Conditional Random Field (CRF) formulation.

In one embodiment of the vision apparatus 100, given a set of training videos containing $N_s$ type of scene type identities, one scene classifier is trained for each type of scene. Assuming that the identity of a frame is independent of any other frame identity, each sampled frame is evaluated to determine the scene identity, by comparing the scores $S_i$ of each one of the $N_s$ trained scene classifiers, and selecting the class with maximum score for the particular frame. The vision apparatus 100, in one embodiment, takes account of the dependence in the temporal domain when dealing with first-person camera videos. For example, it is clear that a person requires some time to move from one scene to another, therefore if a person is known to be in a particular scene, it is very likely that person will remain in the same scene during some frames. The program instructions of the vision apparatus 100 are based on this understanding.

Figure 22:
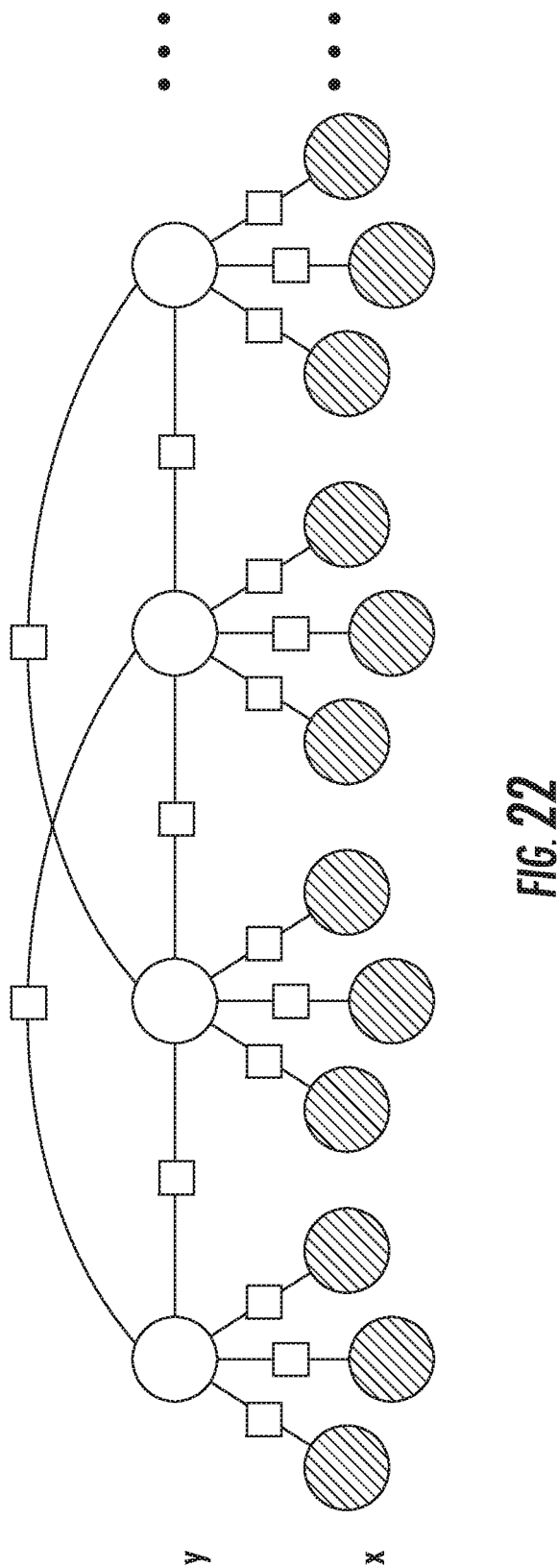
FIG. 22 shows a graphical model representing temporal dependencies for scene labeling in a first-person camera video, such as the vision apparatus of FIG. 1, the observations are shown as shadowed nodes and label assignations as white nodes, a total of r=2 previous observations are represented in the figure and three possible scene types.

For example, a Conditional Random Field (CRF) formulation is configured to model the temporal constraint and to find a set of labels that best fit the scores of the $N_s$ scene classifiers for a video sequence with N frames. FIG. 22 illustrates a graph connecting frame labels temporally with their r previous frame labels, and each frame label depending on the current observations.

Let Pr(y|G; ω) be the conditional probability of the scene label assignments y given the graph G($S_p$, Edge) and a weight w the following energy equation should be minimized:

$$\log(Pr(y|G;\omega)) = \sum_{s_i \in S_p} \psi(y_i|s_i) + \omega \sum_{s_i, s_j \in Edge} \phi(y_i, y_j | s_i, s_j)$$

where ψ are the unary potentials, and φ are the pairwise edge potentials. The unary potential is determined by a normalized scene classification score $S_i$ as $$\psi = 1 - S_i$$

which privileges scene labels with high scores.

The pairwise edge potential is simply given by a matrix $V(y_p, y_q)$ with ones in all their entries except in the diagonal which are zero. This matrix penalizes changes in the scene identity for frames of the image data linked by edge potentials in the graph, enforcing temporal continuity of scene identities.

The energy function to minimize can be represented as:

$$E(y) = \sum_{p=1...N} \psi(p, y_p) + \sum_{p=1...N, q=1...N} w_{p,q} V(y_p, y_q)$$

where $w_{p,q}$ is a weighted adjacency matrix, with weights equal to 1/r being r the number of previous frames that the current frame is connected to.

The graph-cuts based minimization method is used to obtain the optimal solution for the above equation, and to improve the scene detection accuracy exploiting the inherent temporal constraint of egocentric vision.

When working with a method for object detection that provides bounding boxes and their confidence scores, such as the method 600 described above in connection with the vision apparatus 100, the performance of the detector can be increased by incorporating information about the particular type of the scene of the frame of the image data that is being tested. Specifically, the detection scores of the object detection data should be increased or decreased to account for the chances of having the object in a type of scene.

FIGS. 7 and 8 explain this method. In FIGS. 7 and 8, the object "microwave" is used along with its associated ground-truth and DPM detection scores from certain training videos of the Activities of Daily Living (ADL) dataset. Here, the X-axis represents the scores produced for each detection, and the Y-axis represents how well the bounding box detection matches with respect to the ground-truth bounding boxes measured using same criteria as PASCAL VOC challenge (Area Overlap/Area Total). A correct detection is considered when the Bounding box PASCAL-overlap score exceeds 0.5. Each dot in any of the figures represents a candidate bounding box. In this example, the non-circled dots represent kitchen, and the circled dots represent a studio/room. It is clear that many valid detections (i.e. PASCAL-overlap score is over 0.5) can be found in the kitchen scenes. In the other side, the figure shows that there is not a single valid microwave detection in studio/room scenes for the training dataset, which is consistent with our common sense appreciation. If a threshold is selected for the object detection score that captures most of the valid detections in the kitchen, then such threshold produces lots of false microwave detections in the studio/room scene; but if a high threshold for microwave detection is set up (in order to avoid adding invalid detection of the studio/room scenes), then a lot of correct detections from the kitchen will be ignored. FIG. 8 shows a possible re-scoring for the object detection scores based on the scene identity that deals with the fact that microwaves are not located in the studio/room. As can be appreciated from FIG. 8, a simple shifting in the score detection values based in the scene identity improves the results of object detection. In this case, the detections from the studio/room scenes do not add any false positives.

For each detected object, an optimal shifting of the detection score for each scene identity is learned using a simple algorithm. The algorithm uses as input the detection scores of the object detector and their bounding box proposal overlap scores with respect to the ground-truth bounding boxes (measured using Area Overlap/Area Total) for each type of scene. The detections are grouped according to type of scene of the frame. Firstly, the algorithm selects a type of scene to be used as reference to perform the detection score shifting. The scenes are sorted in descending order according to the mean Average Precision (mAP) score of the object detector, and the reference scene is selected from the top. Once the reference is selected, scenes that do not contain any valid detections according to the PASCAL-overlap criteria are processed first (same case as FIG. 8). The detection score for this kind of scene is negative and the magnitude of the shifting is given by the difference between the lowest detection score value of a valid bounding box in the reference scene, and the value of the highest score of the new type of scene being processed, plus a fixed GAP protection value. The remaining scenes are processed one by one starting from the scene with highest mAP from the sorted list of scenes. For each type of scene, the procedure is an exhaustive search of the shift value that produces the maximum mAP after adding the shifted detections of the current scene.

This disclosure presents a framework to use the general visual information of the frame sequences of image data, and imposes temporal constraints with the purpose of estimating how likely certain type of objects are present in the frame (without using a specific object detection method). Such information improves the results of the existing object detectors.

The framework is based on a feedback network called Long Short-Term Memory (LSTM). LSTM are a type of neural network that allows connections from layer n to layer n as well, creating loops that allow the network to use information from previous passes, acting as memory. LSTM is able to actively maintain self-connecting loops without degrading associated information. FIG. 4 depicts the internal structure of a LSTM unit. It takes an input vector $X_t$ at each time step t and predicts an output $h_t$. In contrast to a simple Recurrent Neural Network (RNN) unit, the LSTM unit additionally maintains a memory cell c, which allows it to learn longer term dynamics by reducing the influence of the vanishing gradient problem. As a consequence, LSTM is a very effective technique to capture contextual information when mapping between input and output sequences.

There are many variations in the implementation of LSTM units. The exemplary implementation described herein includes the following set of equations in time t to update inputs $x_t$, $h_{t-1}$ and unit cell $c_{t-1}$:

$$i_t = \sigma(W_i X_t + U_i h_{t-1} + b_i) \quad (1)$$

$$f_t = \sigma(W_f X_t + U_f h_{t-1} + b_f) \quad (2)$$

$$g_t = \phi(W_g X_t + U_g h_{t-1} + b_g) \quad (2)$$

$$c_t = f_t \odot c_{t-1} + i_t \odot g_t \quad (4)$$

$$o_t = \sigma(W_o X_t + U_o h_{t-1} + b_o) \quad (5)$$

$$h_t = o_t \odot \phi(c_t) \quad (6)$$

where equation (1) corresponds to the input gate, equation (2) corresponds to the forget gate, equation (3) is the input modulation gate, equation (4) is the memory cell, equation (5) corresponds to the output gate, equation (6) controls the output, and W and b are respectively the weights and biases learned from the cross-entropy loss.

Figure 23:
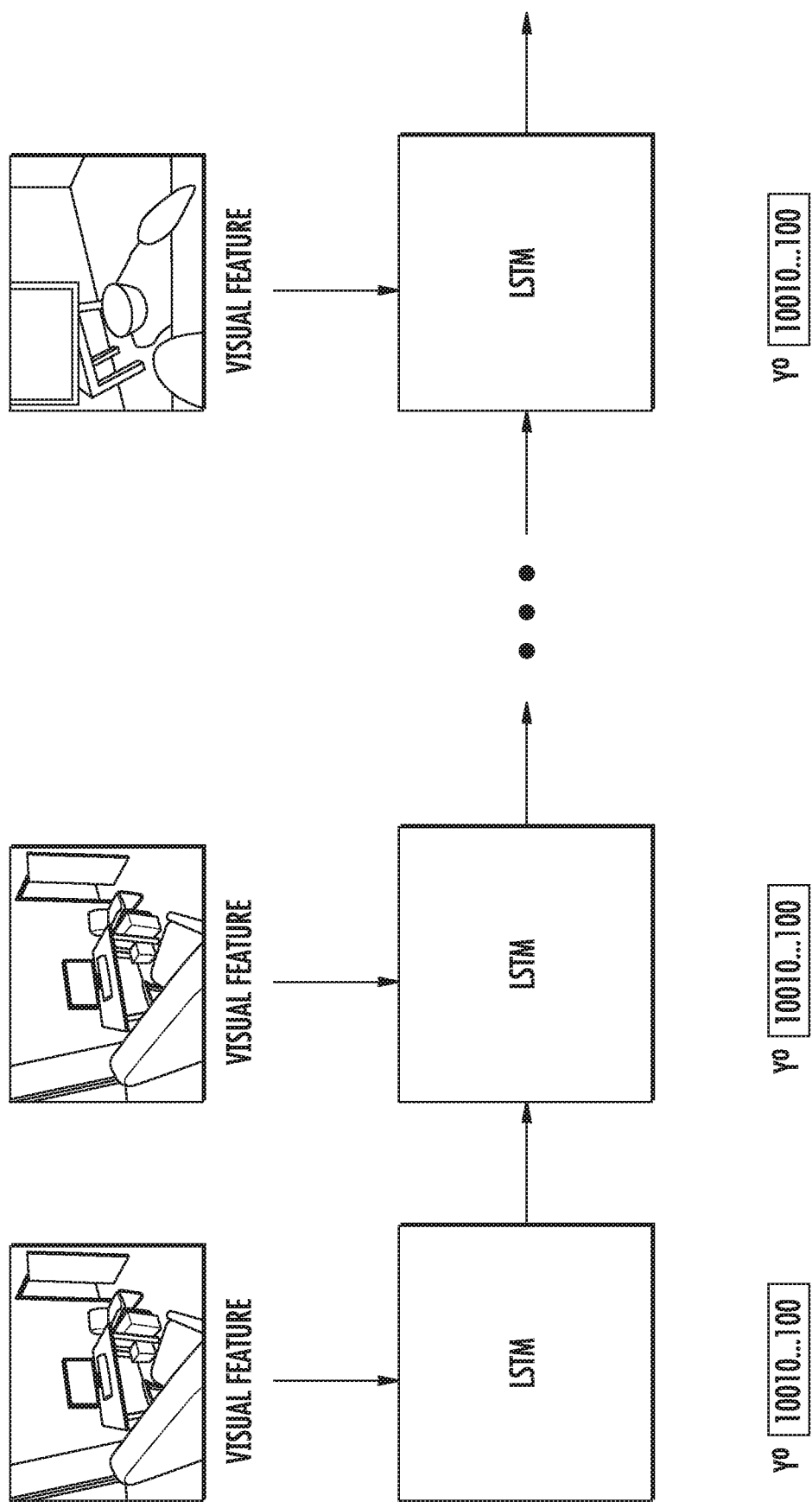
FIG. 23 shows a framework for use with the vision apparatus of FIG. 1 including a plurality of the LSTM units of FIG. 4.

This framework is depicted in FIG. 23. Every frame of image data generated by the camera is preprocessed to obtain a visual image descriptor which is fed into a Long Short-Term Memory (LSTM) network. The system is trained to produce the correct answer to the question, "Which objects are visible in the image?"

The answer to the question is encoded also as a binary vector $Y^o = [y_1^o, y_2^o, \ldots, y_{N_o}^o]$, where $N_o$ is the number of possible objects to be considered, and $y^o \in \{0,1\}$. The vector $Y_o$ has non-zero entries at the positions that indicate the indexes of existing objects in the frame. In training time, the method uses the information of every frame to fill out the vector $Y_o$, and the image descriptor X.

In testing time, for each frame descriptor, a vector $Y_o$ is obtained with values in the range [0 1]. The $N_o$ dimensions of the vector indicates how likely is finding a type of object given the visual information of the frame and its history. Consequently, it is a good source of contextual information.

In practice, this likelihood is used as a way to re-score the results of object detectors according to the general information of the scene by means of a simple re-scoring function $$S_{pj}^{new} = S_{pj} + k * Y_p^o \quad (7)$$

where $S_{pj}^{new}$ is the new score for the instance j of object type p, $S_{pj}$ is the score result of the object detector j for object type p, $Y_p^o$ is the output of the LSTM that indicates the likelihood of having the object p in the scene, and k is a constant that indicate the importance of the scene information in the final score. The value of k is determined from a small validation set containing ADL egocentric videos.

The methods described herein have been extensively experimented in the Activities of Daily Living (ADL) dataset. ADL dataset captures High Definition (HD) quality video from eighteen daily indoor activities such as washing dishes, brushing teeth, or watching television, each performed by twenty different persons in their own apartments. Each video has approximately thirty minutes length, and all frames of image data are annotated every second with object bounding boxes of forty-two different object classes. From the forty-two annotated object classes, results of a trained Deformable Part based Model (DPM) are provided for about seventeen of them. They are used to improve the object detection results provided.

The ADL dataset provides splits for separating training and testing data. From the twenty videos of the dataset, the first six of them were used as training data for object detection. The same procedure is followed to obtain training data for the scene identification task, and for train the LSTM network.

In order to evaluate the object detectors, the standard mean Average Precision (mAP) evaluation metric is used. Specifically, the classical PASCAL VOC criteria are used, which establishes that at least a value of 0.5 on the overlap/union ratio among ground-truth and detection bounding boxes is needed to declare the bounding box as a valid detection.

Scene identity annotations were performed for all the video frames of the dataset and eight scene types were identified in the dataset including kitchen, bedroom, bathroom, living room, laundry room, corridor, outdoor, and none of them (blurred frames, or non identified place). From the twenty videos of the dataset, the first six of them were used as training data following the original data splittings for object detection. In order to evaluate the object detectors, the standard mean Average Precision (mAP) evaluation metric was used.

The method includes performing frame by frame scene identification using four baseline methods, and applying them over the thirteen videos of the test dataset. From there it can be shown that the overall accuracy for scene identification methods is improved for all the baselines using the proposed CRF formulation.

Multi-Scale Orderless Pooling of Deep Convolutional Activation Features (MOPCNN) is the current state of the art for scene classification. Therefore, in one embodiment, this method was used as one of the baselines. MOPCNN operates in three scales, all of them using the sixth fully connected layer output of the Krizhevsky's CNN. In the full image scale, the descriptor is directly the output of the sixth layer, while for the other two scales the descriptor is created by VLAD encoding of periodically sampled CNN features in different scales and dimensional reduction.

The first baseline used for scene identification is a Bag of Words (BoW) encoding of CNN features over object proposals (instead of periodically) selected by using the selective search window technique, the second baseline is the complete MOPCNN method, the third baseline is the full scale of the MOPCNN method (MOPCNN-L1) i.e. the global CNN descriptor, and finally the fourth baseline is the third scale of the MOPCNN (MOPCNN-L3) which uses VLAD encoding in the 64×64 pixels scale.

Caffe was used to implement CNN feature extraction. For the Bag of Words implementation, a total of two hundred object proposals were used and the dictionary size was fixed in five thousand words. For all the baselines, we use a linear SVM classifier as classifier.

The overall accuracies for the baselines and the improvement obtained after applying the proposed method to exploit the egocentric temporal constraint is showed in the following table:

|  | BoW CNN | MOP CNN | CNN L1 | CNN L3 |
| --- | --- | --- | --- | --- |
| No Time | 50.45 | 64.53 | 64.08 | 63.87 |
| Proposed CRF | 65.52 | 68.53 | 71.85 | 69.88 |
| Improvement | +15.07 | +4.00 | +7.78 | +6.01 |

In all the cases, there is a clear improvement in the accuracy. The relative improvement is huge particularly for the weakest scene classifier used as baseline, the Bag of Words CNN features. As is expected, the state of the art method (MOPCNN) has the best accuracy between the baselines before using the egocentric temporal constraint. After applying the method disclosed herein, the improvement is superior for the other methods that only use one scale CNN as classifier, producing a better accuracy than the complete MOPCNN method. This surprising result, indicates that in real life applications, a weaker but less computational intense scene classifier can be used in replace of computational expensive methods as long as the temporal constraint is exploited.

Experiments were performed to show that given the object detection results and their scores, is possible to improve the detection results (measured by the mAP) by re-scoring the detectors based on the scene. In one embodiment, the DPM object detection results provided with the dataset are used. The DPM models themselves are not provided, only the bounding boxes, and scores of the detections obtained in the training and testing videos. The bounding boxes of the training data are separated according to the type of scene and object and the method described above is used to learn shifting values.

FIGS. 9-20 show some qualitative results of five object detectors with a detection threshold fixed on −0.7 using DPM object detector, for some random frames covering different scenes. FIGS. 9, 11, 13, 15, 17, and 19 show the detection results without using scene information, while the FIGS. 10, 12, 14, 16, 18, and 20 show the obtained detection after performing re-scoring considering the scene identity. The number of false microwave detections is reduced for the scene in the bedroom, living room, and bathroom. In the same way, false positives objects such as tv are removed from the scenes in the kitchen, and bathroom.

|  | DPM | DPM Known scene | | DPM + CNN-L1 | | LSTM | |
| --- | --- | --- | --- | --- | --- | --- | --- |
| bed | 8.74 | 10.32 | +1.58 | 9.01 | +0.27 | 9.37 | +0.63 |
| book | 11.93 | 11.12 | −0.8 | 12.11 | +0.18 | 12.54 | +0.61 |
| bottle | 1.76 | 1.83 | +0.07 | 1.73 | −0.03 | 1.69 | −0.07 |
| cell | 0.19 | 0.35 | +0.16 | 0.18 | −0.01 | 0.19 | +0.0 |
| detergent | 3.90 | 4.64 | +0.74 | 4.02 | +0.12 | 3.96 | +0.06 |
| dish | 1.26 | 0.98 | −0.3 | 1.53 | +0.27 | 1.38 | +0.12 |
| door | 12.60 | 7.82 | −4.8 | 12.83 | +0.23 | 14.24 | +1.64 |
| fridge | 24.80 | 28.45 | +3.65 | 25.95 | +1.15 | 26.36 | +1.56 |
| kettle | 12.16 | 13.02 | +0.86 | 11.43 | −0.7 | 13.01 | +0.85 |
| laptop | 38.52 | 40.41 | +1.89 | 38.99 | +0.47 | 39.81 | +1.29 |
| microwave | 17.76 | 21.37 | +3.61 | 18.88 | +1.12 | 19.57 | +1.81 |
| pan | 6.15 | 6.70 | +0.55 | 6.23 | +0.08 | 6.58 | +0.43 |
| pitcher | 1.37 | 1.69 | +0.32 | 0.68 | −0.7 | 1.27 | −0.1 |
| soap | 5.12 | 6.34 | +1.22 | 5.43 | +0.31 | 6.00 | +0.88 |
| tap | 30.15 | 32.40 | +2.25 | 30.19 | +0.04 | 29.59 | −0.56 |
| remote | 4.88 | 6.28 | +1.40 | 5.14 | +0.26 | 6.12 | +1.24 |
| tv | 44.09 | 46.88 | +2.79 | 45.70 | +1.61 | 45.12 | +1.03 |

The above table presents a comparison of the mAP for each video of different object detectors for four different cases. Each case is presented in a different column. They are: 1) DPM based object detection provided with the ADL dataset, 2) Improved object detection assuming perfect scene identification, 3) Improved object detection using the scene identification results from global descriptor (L1) and the CRF temporal constraint procedure, and 4) Improved object detection using a LSTM without explicitly using scene labeling.

The first column is the baseline method for object detection, DPM object detector, where information relative to the scene is not considered. The second column presents the results after re-scoring the object detection scores assuming that the location of the scene is known. In one embodiment, this case is an upper bound limit in the performance gain for the method disclosed herein. As can be appreciated, the gains are higher than in any other of the methods under consideration. In the third column, the best scene identification method is used that was obtained from the experiments of the previous section, the model trained using the CNN features in full scales (L1) in conjunction with CRF, to re-score the object detection results. The value of the mAP increases in thirteen out of seventeen available object detectors for this method. The objects that had a decrease in the rate detection are actually very bad detectors like bottle (1.73 mAP), cellphone (0.19 mAP), or pitcher (1.37 mAP), where the detection scores are not from any help, while the improvement is consistent in good object detectors like fridge, laptop, microwave, or tv.

Finally, the fourth column of the table presents the results for the improved object detection without explicitly using the label of the scene. In order to obtain these results, the first six videos of the dataset for the training phase of the LSTM network was used. These videos contain information about which objects are shown in each one of the sampled frames. The $Y^\circ$ vectors were built forming groups with duration of twenty seconds and an overlap of eight seconds. The scene descriptor of the MOPCNN method was used to feed the network. The training was performed in batches of 16 groups executing a total of 30,000 epochs.

In testing phase, each frame of image data was fed with the scene descriptor, and a vector was obtained that indicates the likelihood of having the indexed object (in each dimension) given the general scene content. Equation (7) was used to re-score the object detection. The value of k in our validation set was 0.11.

The proposed LSTM method produces improvements in fourteen out of seventeen object detectors. Furthermore, the improvements obtained are clearly higher than the improvements obtained based in re-scoring the output of our best scene detection (i.e. column 3).

The method 600 disclosed herein presents algorithms for leveraging inherent constraints of egocentric vision towards improved scene identification and object detection capabilities. The method 600 takes advantage of the scene identity of a first-person video remaining consistent for several frames. The CRF formulation improves the frame level scene identification results of several baselines including the current state of the art method for scene identification. The association between some type objects with some scene locations results in a re-scoring algorithm to improve the object detection according to the scene content. For the case where an explicit scene labeling is not available, the LSTM formulation directly estimates the likelihood of having some objects given a sequence of scene descriptors. Such formulation is usable to improve the object detection results respect to the baseline. The presented algorithms were implemented and tested on the well-known public ADL dataset.

The disclosure provided below includes additional information describing the vision apparatus 100. The vision apparatus 100 uses context to improve object detection. Most generic object detection models completely ignore the type of scene and the context from the objects and the scene. In real life, however, objects are typically associated to particular types of scenes. Accordingly, the method uses modeling about the object and area context, by learning the scene where the object is typically found. In testing time, models of objects are varied according to the scene content (context) of the tested frame, improving the object detection. In particular, the vision apparatus 100, in one embodiment, uses egocentric camera videos, where the object detection is more challenging since high variability of object models and scenes, achieving an improvement of X in the mAP relative to the object detection in the Activities of Daily Living (ADL) dataset. Additionally, the object model detection algorithm performs a sliding window technique in single scale using Convolutional Neural networks. The latter produces better results compared to the detections obtained by Deformable Part based Models.

In one embodiment, the vision apparatus 100 detects object instances from Activities of Daily Living (ADL) recorded from an egocentric camera. Object detection task targets to find the location of objects in a frame. Traditional approaches uses human labeled bounding boxes of objects as training data to find a model with the available image features, while ignoring the background information that accounts for context. Any other visual feature that is not included in the bounding box is used as negative data playing the role of distractor. However, in the real world the objects are not simply placed centered over a texture-less background. Objects are part of a context that includes its spatial location and the background of the scene.

Figure 24:
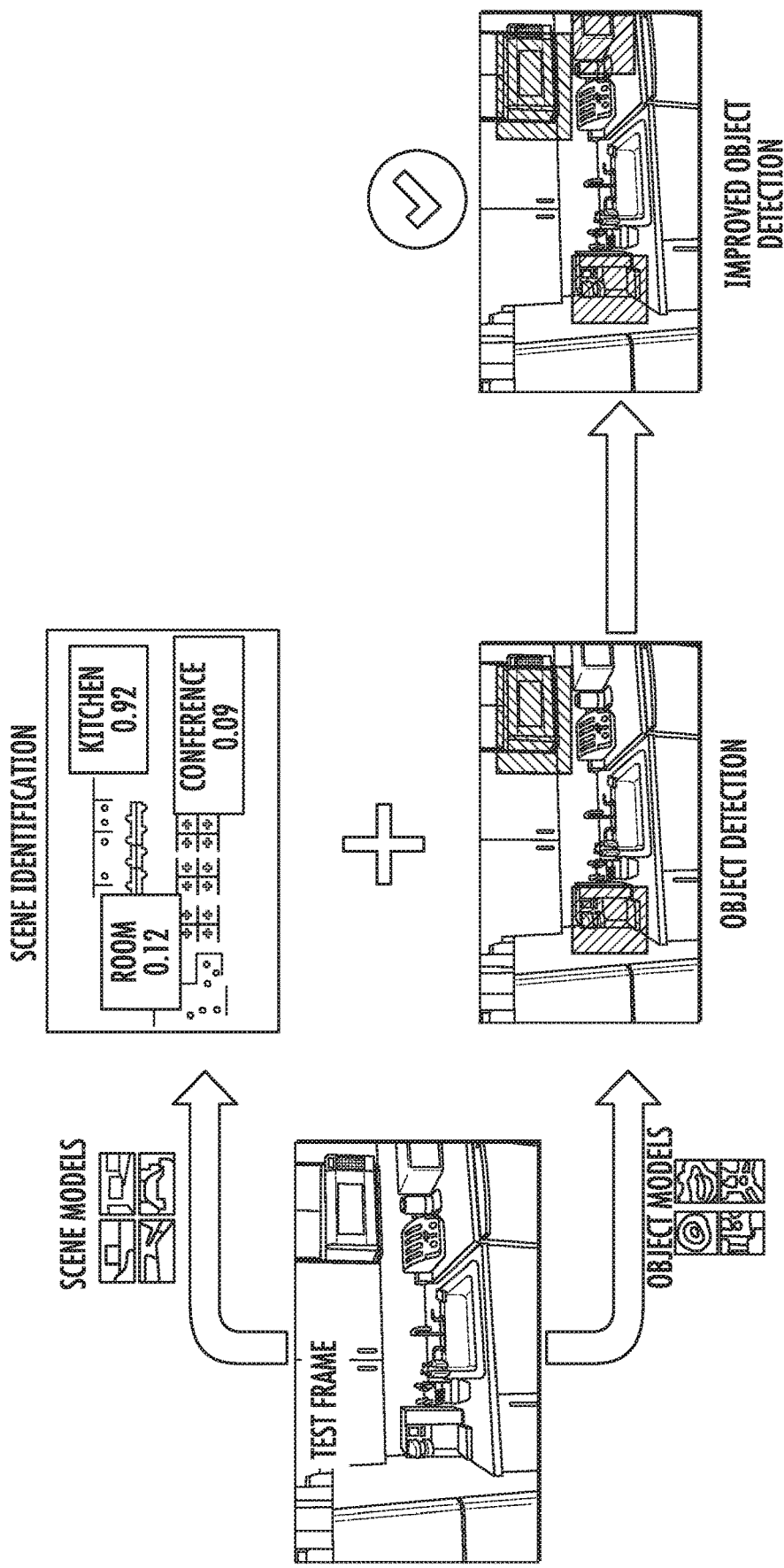
FIG. 24 shows a block diagram of an exemplary object detection system used by the vision apparatus of FIG. 1.

An exemplary diagram of a method of operating the vision apparatus 100 is shown in FIG. 24. The diagram uses scene type as context. Given a test frame of image data, the vision apparatus 100 identifies the scene where the video is recorded. Daily activities are performed typically on indoor environments that are common for most of the users like kitchen, bathroom, garage, living room, bedroom, and others. These places are discriminative categories that impose strong priors in the type of object that can be found. Each instance of any of these scenes is different from user to user, however given a set of training data for the categories, discriminability between scenes can be still reached. In real life applications short videos of the instance places can be added to improve performances. The vision apparatus 100 performs object detection in the frames of image data to find the objects of interest using models trained in ADL data. The object models are not calibrated and they are not comparable, in one embodiment. The vision apparatus 100 uses the uncalibrated detection scores and the probability of occurrence of an object over a validation set, to perform calibration in test time according to the type of scene that is currently predicted for the scene classifier. Hence, the vision apparatus 100 incorporates the context in test time to improve object detection as explained in detail below.

Figure 25:
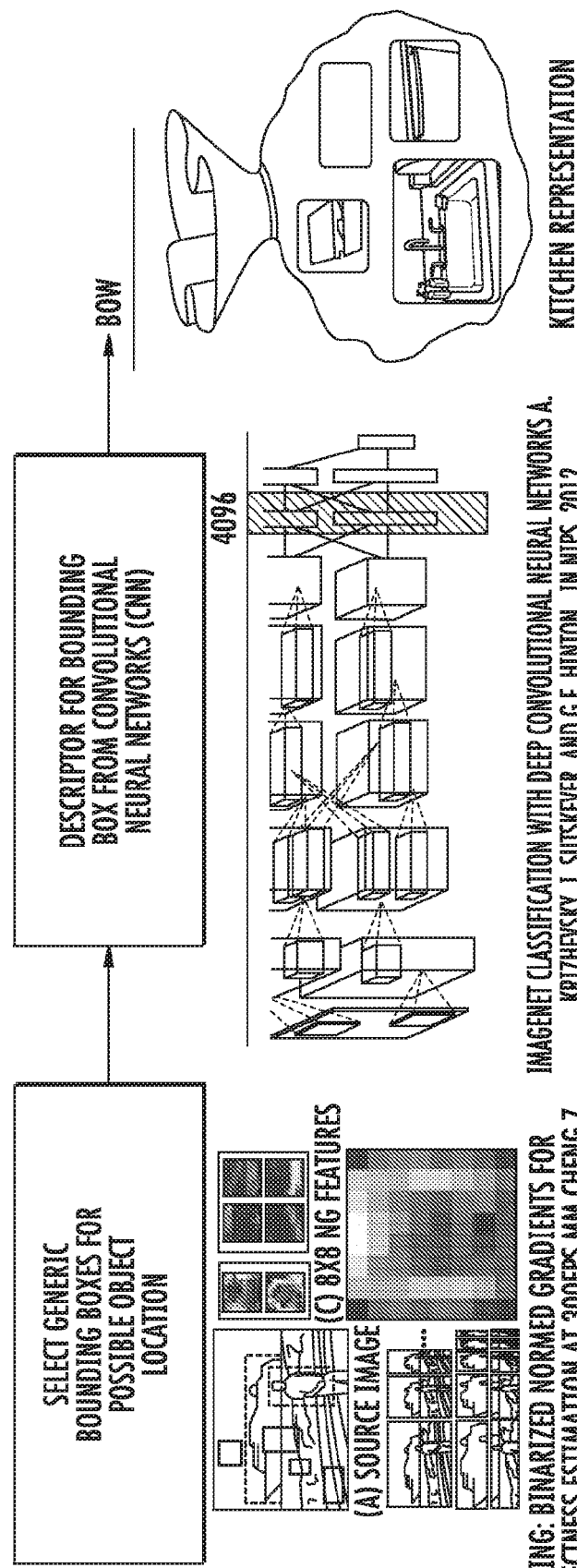
FIG. 25 shows a block diagram of an exemplary scene identification algorithm used by the vision apparatus of FIG. 1.

In one embodiment, the vision apparatus 100 uses an algorithm to perform scene identification that uses a selective search window technique to look for possible generic objects and a CNN that is used as mid-level feature representation of generated proposals. FIG. 25 presents a diagram of one embodiment of the proposed algorithm for scene identification. Selective search window technique produces a small set of candidate object windows training a generic objectness measure obtained from the norm of gradients in resized eight by eight windows. The generated bounding proposals are trained to capture category-independent object windows with high quality. Each proposal is re-sized to fit into the Convolutional Neural Network (CNN) created by Krizhevsky and trained with ImageNet data. The first five layers of this network are convolutional and the last three layers are fully-connected neural networks. The last layer contains one thousand output units fed to a softmax function that determines the class label output. The vision apparatus 100, in one embodiment, uses a mid-level representation of the image, thus the last two layers of the network may be removed. Features are then calculated by forward propagation of a mean subtracted 224×224 RGB image over five convolutional layers and one fully connected layer (fc6 layer). The result is a 4,096 dimension vector that represents the object proposal. In order to encode the scene using the object proposals, in one embodiment, the vision apparatus 100 uses a Bag of Words paradigm, but other types of encoding such as Improved Fisher Vector (IFV) or VLAD could be used instead. Linear SVM is used as classifier in one embodiment. The output of the classifier is interpreted as the scene probability, and weighted using the probabilities obtained from previous frame and renormalized. This basic procedure allows the vision apparatus 100 to impose temporal consistency in the scene identity.

In one embodiment, the vision apparatus 100 uses an algorithm for object detection based on the convolutional neural networks to perform a sliding window technique in multiple models of different sizes for each category. Krizhevsky's Convolutional Neural Network (CNN) uses a fixed 224×224 image input that runs forward thru five convolutional layers. Processing the five convolutional layers is the most computational expensive part from the feed forward process. However, it only involves local operations relative to a small supporting image patch; the pixel by pixel mean subtraction can be replaced for an average pixel value subtraction because mean patch is almost constant for all the pixel, while convolutions, relu, and max-pooling are all local operations of the supporting image patch, and do not depend on the relative location of the node within its image. As a consequence, any bounding box that uses the same supporting patch only need to be calculated once. The latter is not true for the fully connected layers, therefore only the five convolutional layers are considered to represent images. The result of feed forwarding any image in the first five convolutional layers is a set of 256 bi-dimensional filters, where each pixel of the resulting image covers a region of 32×32 pixels from the input image.

Figure 26:
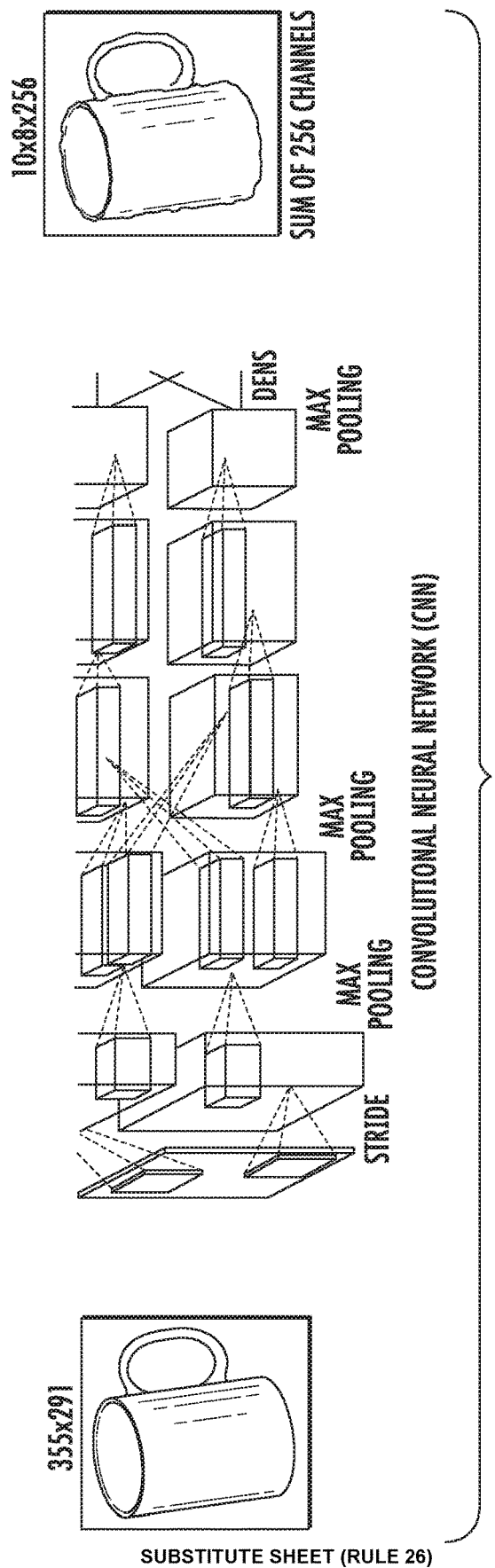
FIG. 26 shows a block diagram of an exemplary representation of an object detected by the vision apparatus of FIG. 1.
Figure 27:
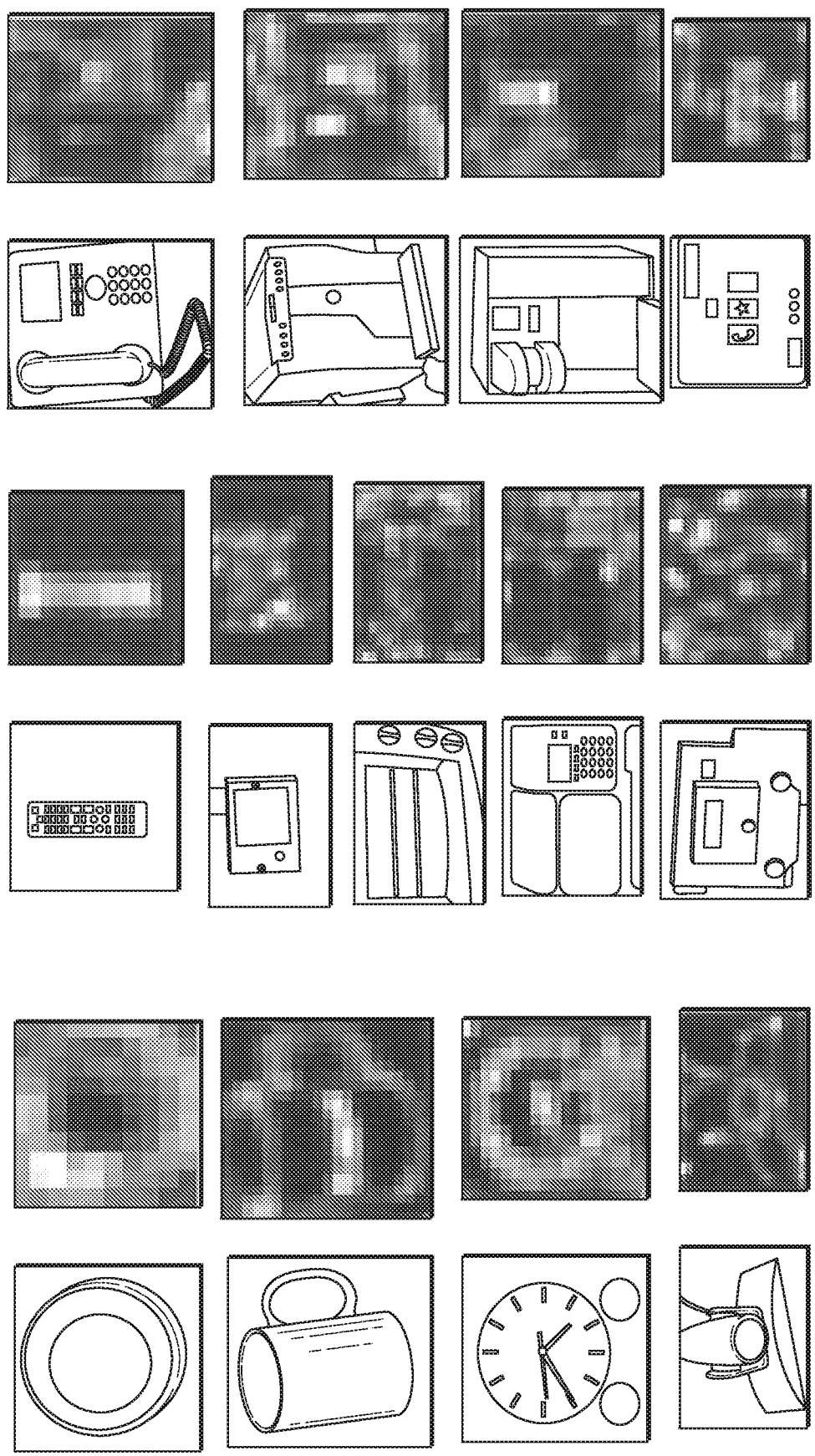
FIG. 27 shows example images of detected objects and visualizations of their representations.

FIG. 26 exemplifies this process, where the 256 channels are added in order to visualize the obtained descriptor. FIG. 27 shows several images and their descriptors. The filters capture important aspects of the image useful for discrimination though the network, which is trained with data from other dataset.

The dimension of the descriptor for any image depends on its size. The standard way of modeling an object is clustering the training data based on aspect ratio, and building an object model for each cluster. Training data is resized to fit into one of the available aspect ratios, and testing image descriptor is calculated for different scales using pyramids. Instead of clustering the training data only based on aspect ratio, in one embodiment, the vision apparatus 100 clusters the training data considering aspect ratio and size, incorporates the scale as new models of the same object, and avoids the calculation of pyramids. Object detection models trained using large collection of web images such as ImageNet or Pascal dataset typically fail in egocentric camera data because web collections typically only contain iconic views of the objects. Instead of using this type of training data, in one embodiment, the networks of the vision apparatus 100 are trained from data extracted from frames recorded by first person camera system. Linear SVM is used to train the models. In testing time, a list of all possible bounding boxes than can be built on the frame and match the available model sizes is built. A simple dot product determined a detection score. The score detection is not calibrated and the scores between models are not comparable. Calibration is performed considering the scene identification outputs to improve the object detection.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of discriminating detected objects in an area including a plurality of objects with a vision apparatus including a processor and a memory storing scene type data and object identification data, the method comprising:
   receiving image data of a portion of the area;
   classifying the received image data as an imaged scene type selected from a plurality of scene types stored as the scene type data in the memory;
   processing the received image data and the object identification data to generate object detection data for each detected object in the portion of the area, the object detection data including a textual identification of each detected object;
   assigning a corresponding scene type of the plurality of scene types to the object detection data for each detected object, such that for each of the detected objects the object detection data includes the textual identification and one of the corresponding scene types of the scene type data;
   discriminating the detected objects by identifying the detected object data having an assigned scene type that is the same as the imaged scene type; and
   generating an object identification output only for the discriminated detected objects with object detection data having the assigned scene type that is the same as the imaged scene type,
   wherein the image data includes a plurality of frames and processing the image data and the object identification data comprises:
      processing the plurality of frames to generate image descriptor data for each frame, the image descriptor data based on the detected objects; and
      processing each image descriptor data through a Long Short-Term Memory (LSTM) network stored in the memory to arrive at the object detection data, the LSTM network trained to identify the objects of the plurality of objects.

2. The method of claim 1, wherein:
   processing the received image data and the object identification data comprises assigning each object detection data a detection score; and
   discriminating the detected objects comprises shifting by a predetermined value the detection scores of the object detection data having a corresponding scene type that is different from the imaged scene type, such that the object detection data having a corresponding scene type that is the same as the imaged scene type are isolated from the object detection data having a corresponding scene type that is different from the imaged scene type.

3. The method of claim 2, wherein discriminating the detected objects further comprises:
   determining a lowest detection score of the object detection data having a corresponding scene type that is the same as the imaged scene type;
   determining a score value equal to a sum of (i) a highest detection score of the object detection data having a corresponding scene type that is different from the imaged scene type, and (ii) a fixed value; and
   determining the predetermined value as a difference between the lowest detection score and the score value.

4. The method of claim 1, wherein classifying the received image data comprises:
   processing the plurality of frames of the image data and classifying each processed frame with a scene type selected from the plurality of scene types; and
   determining the imaged scene type as the scene type most frequently classified during the processing of the plurality of frames.

5. The method of claim 4, wherein classifying each processed frame with a selected scene type comprises:
   assigning each frame of the plurality of frames a scene score for each scene type of the plurality of scene types, each scene score indicative of a probability that the corresponding frame corresponds to a particular scene type, and
   determining the selected scene type of each frame as the scene type of the plurality of scene types corresponding to the highest scene score for each corresponding frame.

6. The method of claim 1, wherein the vision apparatus includes a display, and generating the object identification output comprises:

rendering at least the textual identification of the object detection data having the assigned scene type that is the same as the imaged scene type on the display, wherein the object detection data having an assigned scene type that is different from the imaged scene type of the image data is ignored.

7. The method of claim 1, wherein the vision apparatus includes a speaker, and generating the object identification output comprises:

generating an audio signal corresponding to the textual identification for each object detection data having the assigned scene type that is the same as the imaged scene type; and sending the generated audio signal to the speaker, such that the discriminated detected objects are announced in a user understandable format by the speaker.

8. The method of claim 1, wherein:

a first object detection data corresponds to a first detected object of the plurality of objects and is assigned a first scene type, a second object detection data corresponds to the first detected object of the plurality objects and is assigned a second scene type different from the first scene type, the imaged scene type is the first scene type, and only the first object detection data is used in generating the object identification output.

9. The method of claim 1, wherein the LSTM is trained to output data corresponding to an identification of the detected objects of the plurality of objects that are identified in the received image data.

10. A vision apparatus configured to discriminate detected objects in an area including a plurality of objects, comprising:

an imaging device;

a memory storing scene type data, object identification data, and program instructions; and a processor operably connected to the imaging device and the memory, the processor configured to execute the program instructions:

to receive image data of a portion of the area from the imaging device, to classify the received image data as an imaged scene type selected from a plurality of scene types stored as the scene type data in the memory, to process the received image data and the object identification data to generate object detection data for each detected object in the portion of the area, the object detection data including a textual identification of each detected object, to assign a corresponding scene type of the plurality of scene types to the object detection data for each detected object, such that for each of the detected objects the object detection data includes the textual identification and one of the corresponding scene types of the scene type data, to discriminate the detected objects by identifying the detected object data having an assigned scene type that is the same as the imaged scene type, to ignore the object detection data having an assigned scene type that is different from the imaged scene type, and to generate an object identification output only for the discriminated detected objects with object detection data having the assigned scene type that is the same as the imaged scene type, wherein the image data includes a plurality of frames and the processor is further configured to execute the program instructions:

to process the plurality of frames to generate image descriptor data for each frame, the image descriptor data based on the detected objects; and to process each image descriptor data through a Long Short-Term Memory (LSTM) network stored in the memory to arrive at the object detection data, the LSTM network trained to identify the objects of the plurality of objects.

11. The vision apparatus of claim 10, wherein to discriminate the detected objects, the processor is further configured to execute the program instructions:

to assign each object detection data a detection score; and to shift the detection scores of the object detection data having a corresponding scene type that is different from the imaged scene type by a predetermined value, such that the object detection data having a corresponding scene type that is the same as the imaged scene type are isolated from the object detection data having a corresponding scene type that is different from the imaged scene type.

12. The vision apparatus of claim 11, wherein to discriminate the detected objects, the processor is further configured to execute the program instructions:

to determine a lowest detection score of the object detection data having a corresponding scene type that is the same as the imaged scene type, to determine a score value equal to a sum of (i) a highest detection score of the object detection data having a corresponding scene type that is different from the imaged scene type, and (ii) a fixed value; and to determine the predetermined value as a difference between the lowest detection score and the score value.

13. The vision apparatus of claim 10, wherein to classify the received image data, the processor is further configured to execute the program instructions:

to process the plurality of frames of the image data and to classify each processed frame with a scene type selected from the plurality of scene types; and to determine the imaged scene type as the scene type most frequently classified during the processing of the plurality of frames.

14. The vision apparatus of claim 13, wherein to classify the received image data, the processor is further configured to execute the program instructions:

to assign each frame of the plurality of frames a scene score for each scene type of the plurality of scene types, each scene score indicative of a probability that the corresponding frame corresponds to a particular scene type; and to determine the selected scene type of each frame as the scene type of the plurality of scene types corresponding to the highest scene score for each corresponding frame.

15. The vision apparatus of claim 10, further comprising:

a display operably connected to the processor, wherein the processor is further configured to execute the program instructions to render an image based on the object identification output on the display.

16. The vision apparatus of claim 10, further comprising:

a speaker operably connected to the processor, wherein the processor is further configured to execute the program instructions to generate an audio signal based on the object identification output that is indicative of each object detection data having a corresponding scene type that is the same as the imaged scene type, and send the generated audio signal to the speaker, such that objects detected by the vision apparatus are announced in a user understandable format by the speaker.

17. A method of discriminating detected objects in an area including a plurality of objects with a vision apparatus including a processor and a memory storing scene type data and object identification data, the method comprising:

receiving image data of a portion of the area;

classifying the received image data as an imaged scene type selected from a plurality of scene types stored as the scene type data in the memory;

training a Long Short-Term Memory (LSTM) network to generate the object identification data;

processing the received image data and the object identification data to generate object detection data for each detected object in the portion of the area, the object detection data including a textual identification of each detected object;

assigning a corresponding scene type of the plurality of scene types to the object detection data for each detected object, such that for each of the detected objects the object detection data includes the textual identification and one of the corresponding scene types of the scene type data;

discriminating the detected objects by identifying the detected object data having an assigned scene type that is the same as the imaged scene type; and generating an object identification output only for the discriminated detected objects with object detection data having the assigned scene type that is the same as the imaged scene type.

18. The method of claim 17, wherein the vision apparatus includes a display, and generating the object identification output comprises:

rendering at least the textual identification of the object detection data having the assigned scene type that is the same as the imaged scene type on the display, wherein the object detection data having an assigned scene type that is different from the imaged scene type of the image data is ignored.

\* \* \* \* \*